United States Patent
Miyazaki et al.

(10) Patent No.: US 7,023,777 B2
(45) Date of Patent: Apr. 4, 2006

(54) OPTICAL DISK RECORDING/REPRODUCTION APPARATUS WITH A DETECTION MEANS FOR DETECTING DIRT ON THE OPTICAL DISK

(75) Inventors: Atsushi Miyazaki, Kyoto (JP); Chikashi Inokuchi, Osaka (JP); Hiroyuki Yamaguchi, Hyogo (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 328 days.

(21) Appl. No.: 10/169,985

(22) PCT Filed: Jan. 4, 2001

(86) PCT No.: PCT/JP01/00016

§ 371 (c)(1),
(2), (4) Date: Jul. 11, 2002

(87) PCT Pub. No.: WO01/52249

PCT Pub. Date: Jul. 19, 2001

(65) Prior Publication Data

US 2003/0012105 A1    Jan. 16, 2003

(30) Foreign Application Priority Data

Jan. 13, 2000  (JP) ............................. 2000-004278

(51) Int. Cl.
*G11B 7/00* (2006.01)
(52) U.S. Cl. ............................... 369/53.13; 369/53.34
(58) Field of Classification Search ............. 369/53.13, 369/53.34
See application file for complete search history.

(56) References Cited

U.S. PATENT DOCUMENTS 4,375,092 A * 2/1983 Yoshio ................... 369/30.01

FOREIGN PATENT DOCUMENTS

| JP | 58014333 A | * | 1/1983 |
| JP | 03008127 A | * | 1/1991 |

(Continued)

OTHER PUBLICATIONS

English Translation of JP 05144016 A.*

(Continued)

*Primary Examiner*—Brian E. Miller
*Assistant Examiner*—Peter Vincent Agustin
(74) *Attorney, Agent, or Firm*—Renner, Otto, Boisselle and Sklar, LLP

(57) ABSTRACT

An optical disc recording/reproducing apparatus includes: recording/reproducing means for recording/reproducing information by emitting a light beam onto a disc having a track which wobbles at a predetermined frequency; reflected light detection means for detecting the light beam reflected from the disc; wobble signal detection means for detecting a wobble amplitude signal which represents an amplitude of a signal generated from a component which is extracted from an output of the reflected light detection means and which wobbles at the predetermined frequency; and variation rate detection means for detecting dirt adhered on the disc based on a rate of a variation in the wobble amplitude signal, wherein the variation rate detection means detects the dirt based on the wobble amplitude signal before the recording/reproducing means records/reproduces the information.

26 Claims, 19 Drawing Sheets

U.S. PATENT DOCUMENTS

| | | | | |
|---|---|---|---|---|
| 4,821,254 | A * | 4/1989 | Satoh et al. | 369/53.36 |
| 5,210,735 | A * | 5/1993 | Hoshino et al. | 369/53.13 |
| 5,513,160 | A * | 4/1996 | Satoh et al. | 369/47.14 |
| 5,878,014 | A * | 3/1999 | Hoeven | 369/100 |
| 6,418,100 | B1 * | 7/2002 | Park et al. | 369/47.14 |
| 6,621,779 | B1 * | 9/2003 | Inokuchi et al. | 369/47.51 |
| 6,744,718 | B1 * | 6/2004 | Ko et al. | 369/59.25 |

FOREIGN PATENT DOCUMENTS

| | | | |
|---|---|---|---|
| JP | 05144016 A | * | 6/1993 |
| JP | 07176153 A | * | 7/1995 |

OTHER PUBLICATIONS

English Translation of JP 07176153 A.*

* cited by examiner

| Zone No. | Address |
|---|---|
| Zone0 | 32000 |
|  | 39000 |
| Zone1 | 40000 |
|  | 43000 |
| ⋮ | ⋮ |
| Zone33 | 237000 |
|  | 240000 |
| Zone34 | 250000 |
|  | 260000 |

OPTICAL DISK RECORDING/REPRODUCTION APPARATUS WITH A DETECTION MEANS FOR DETECTING DIRT ON THE OPTICAL DISK

TECHNICAL FIELD

The present invention relates to an optical disc recording/reproducing apparatus having a function of being able to detect dirt, such as a fingerprint, etc., adhered on a disc.

BACKGROUND ART

In recent years, apparatuses capable of recording information on and reproducing information from an optical disc have been developed. In the case where an optical disc is not stored in a cartridge, there is a high probability that a fingerprint or the like is left on a surface of the disc when a user handles the optical disc. In the case where dirt, such as a fingerprint or the like, is adhered on the surface of the optical disc, there is a probability that the power of a light beam emitted from an optical disc recording apparatus does not appropriately reach a signal recording plane of the optical disc due to the fingerprint adhered on the surface of the disc, and user data to be recorded is not correctly recorded on the optical disc so that user data is corrupted. In order to avoid such a problem, it is necessary to detect dirt, such as a fingerprint or the like, and protect data before recording of user data. In a known conventional technique, during an operation of recording user data, an already-recorded portion of the user data is reproduced, whereby it can be detected if the recorded user data is corrupted due to an effect of dirt, such as a fingerprint or the like, or a defect. Then, a substitution process is performed to change a recording position of the user data.

Operation of a conventional optical disc recording/reproducing apparatus 2100 for recording user data on an optical disc 100 is described with reference to FIG. 21. In FIG. 21, the optical disc 100 is rotated by a spindle motor 101 at a predetermined rotation rate, and user data is recorded on the optical disc 100 according to the power of a light beam emitted from a pickup 103. A traverse motor 102 can move the pickup 103 in a radius direction of the optical disc 100. A user data transmission circuit 108 transmits to a microcomputer 107 user data to be recorded on the optical disc 100. The microcomputer 107 issues to a servo controller 106 an instruction to move the pickup 103 for recording the transmitted user data at a predetermined address of the optical disc 100. The servo controller 106 drives the traverse motor 102 so as to move the pickup 103 such that the light beam is positioned at a designated address.

The microcomputer 107 outputs the user data to a signal recording circuit 105. The signal recording circuit 105 drives a laser incorporated in the pickup 103 based on the input user data to record the user data on the optical disc 100. The pickup 103 detects light reflected from the optical disc 100 with a detector (not shown in FIG. 21) incorporated therein, and outputs a signal generated based on the detected light to a signal reproduction circuit 104. The signal reproduction circuit 104 reproduces the user data recorded in the optical disc 100 and outputs the reproduced user data to the microcomputer 107.

In the case where dirt, such as a fingerprint or the like, is adhered on the optical disc 100, user data cannot be accurately recorded. Thus, the user data cannot be accurately reproduced by the signal reproduction circuit 104. When the microcomputer 107 detects based on a signal output from the signal reproduction circuit 104, that the user data recorded in the optical disc 100 cannot be correctly reproduced, the microcomputer 107 instructs the servo controller 106 to move the pickup 103 such that a position at which the user data is to be recorded is changed to a substitute region on the optical disc 100. The signal reproduction circuit 104 again reproduces the user data recorded in the substitute region and output the reproduced user data to the microcomputer 107. When the microcomputer 107 detects, based on the signal output from the signal reproduction circuit 104, that the data recorded on the optical disc 100 has been accurately reproduced, the above described operation is repeated for performing an operation of newly recording other user data.

By performing the above operation, it is detected that user data is recorded in a portion of an optical disc to which dirt, such as a fingerprint or the like, is adhered, and that the user data is recorded again in a substitute region, whereby the user data can be protected.

According to the conventional technique of using a function of detecting dirt, such as a fingerprint or the like, after user data is recorded on the optical disc, the recorded user data is reproduced for detecting dirt, such as a fingerprint, adhered on the optical disc. The user data is recorded again in a substitute region such that the user data is not corrupted. However, the size of the substitute region has a limit, and accordingly, in the conventional method, the substitute region sometimes cannot contain all of the user data. Further, in the case where dirt, such as a fingerprint or the like, is adhered to the substitute region, user data cannot be accurately reproduced even when the user data is recorded in the substitute region. As a result, there is still a probability that the user data is corrupted.

An objective of the present invention is to provide an optical disc recording/reproducing apparatus having a function of detecting whether or not dirt, such as a fingerprint or the like, is adhered on a disc before user data is recorded, so as to provide caution concerning the dirt, before recording of the user data.

Another objective of the present invention is to provide an optical disc recording/reproducing apparatus having a function of reminding a user to remove dirt adhered on an optical disc.

DISCLOSURE OF THE INVENTION

An optical disc recording/reproducing apparatus according to the present invention includes: recording/reproducing means for recording/reproducing information by emitting a light beam onto a disc having a track which wobbles at a predetermined frequency; reflected light detection means for detecting the light beam reflected from the disc: wobble signal detection means for detecting a wobble amplitude signal which represents an amplitude of a signal generated from a component which is extracted from an output of the reflected light detection means and which wobbles at the predetermined frequency; and variation rate detection means for detecting dirt adhered on the disc based on a rate of a variation in the wobble amplitude signal, wherein the variation rate detection means detects the dirt based on the wobble amplitude signal before the recording/reproducing means records/reproduces the information. With such a structure, the above objectives are achieved.

The optical disc recording/reproducing apparatus may further include movement means for moving the recording/reproducing means to a plurality of predetermined positions on the disc, wherein the variation rate detection means detects the dirt based on the wobble amplitude signal detected from the light beam emitted onto the disc from the recording/reproducing means which is moved to the predetermined position.

The predetermined positions may be positions corresponding to the plurality of tracks separated at a generally uniform interval.

The optical disc recording/reproducing apparatus may further include a low pass filter control section for extracting a low band component of the wobble amplitude signal, wherein the variation rate detection means compares an output of the low pass filter control section with the wobble amplitude signal to obtain a rate of a variation in the wobble amplitude signal.

The disc may have a track in a guiding groove and a track between the guiding grooves; the low pass filter control section may include a first low pass filter for extracting a low band component of the wobble amplitude signal when the recording/reproducing means is moved to a position corresponding to the track in the guiding groove, and a second low pass filter for extracting a low band component of the wobble amplitude signal when the recording/reproducing means is moved to a position corresponding to the track between the guiding grooves; and the low pass filter control section may switch from the first low pass filter to the second low pass filter when the recording/reproducing means moves from the position corresponding to the track in the groove to the position corresponding to the track between the grooves, and may switch from the second low pass filter to the first low pass filter when the recording/reproducing means moves from the position corresponding to the track between the grooves to the position corresponding to the track in the groove.

The low pass filter control section may include a first low pass filter for extracting a low band component of the wobble amplitude signal when the recording/reproducing means is moved to a position corresponding to the track in which the information has already been recorded, and a second low pass filter for extracting a low band component of the wobble amplitude signal when the recording/reproducing means is moved to a position corresponding to the track in which the information is not recorded; and the low pass filter control section may switch from the first low pass filter to the second low pass filter when the recording/reproducing means moves from the position corresponding to the track in which the information has already been recorded to the position corresponding to the track in which the information is not recorded, and may switch from the second low pass filter to the first low pass filter when the recording/reproducing means moves from the position corresponding to the track in which the information is not recorded to the position corresponding to the track in which the information has already been recorded.

The low pass filter control section may include a first low pass filter having a first cutoff frequency, and a second low pass filter having a second cutoff frequency which is lower than the first cutoff frequency; and the low pass filter control section may switch its output from the first low pass filter to the second low pass filter when the wobble amplitude signal is equal to or smaller than a predetermined ratio.

The optical disc recording/reproducing apparatus may further includes storage means for storing information about the detected dirt, wherein the storage means stores information about a position of a track along a radial direction on the disc where the wobble amplitude signal is equal to or smaller than the predetermined ratio.

An output of the variation rate detection means may be stopped when an output of the low pass filter control section is equal to or smaller than a specific value.

The optical disc recording/reproducing apparatus may further include: warning means for warning about a feature of the dirt, thereby warning that the dirt is adhered on the disc; signal reproducing means for reproducing the information based on an output of the reflected light detection means; and servo means for controlling the recording/reproducing means so as to follow the track on the disc, wherein the warning means warns that it is impossible to warn about the feature of the dirt when the output of the low pass filter control section is equal to or smaller than the specific value, at which the output of the variation rate detection means is stopped, after a passage of a predetermined time period, the warning means warns that it is impossible to warn about the feature of the dirt when the signal reproduction means cannot recognize information of an address region, and the warning means warns that it is impossible to warn about the feature of the dirt when an output of the servo means is in an abnormal state.

The optical disc recording/reproducing apparatus may further include storage means for storing information about the detected dirt, wherein the storage means stores a rate of a variation in the wobble amplitude signal as information which indicates an adhesion strength of the dirt.

The optical disc recording/reproducing apparatus may further includes warning means for warning about a feature of the dirt, thereby warning that the dirt is adhered on the disc, wherein the warning means provides a warning of at least two of information indicating an adhesion strength of the dirt, information which indicates the size of the dirt, information which indicates the number of the dirt, and information which indicates the position of the dirt, which are stored in the storage section, in combination.

The optical disc recording/reproducing apparatus may further include a monitor screen, wherein the warning section displays on the monitor screen at least two of information among the adhesion strength of the dirt, the size of the dirt, the number of the dirt, and the position of the dirt, in combination, thereby warning about the feature of the dirt.

The optical disc recording/reproducing apparatus may further include: storage means for storing information about the detected dirt: and a dirt passage time counter for measuring a period when the wobble amplitude signal is equal to or smaller than a predetermined ratio, wherein the storage means stores an output of the dirt passage time counter as information which indicates the size of the dirt.

The optical disc recording/reproducing apparatus may further include rotation velocity ratio detection means for obtaining a ratio of a disc rotation velocity with respect to a reference disc rotation velocity which is used as a reference for recording/reproducing the information, wherein the storage means corrects an output of the dirt passage time counter according to an output of the rotation velocity ratio detection means, and stores the corrected output, and the storage means corrects an output of the dirt passage time counter by multiplying the output of the dirt passage time counter by a reciprocal of the output of the rotation velocity ratio detection means, and stores the corrected output.

In the case where an output of the dirt passage time counter, obtained when the wobble amplitude signal is equal to or smaller than a predetermined ratio, is equal to or smaller than a specific value, the storage means may store an output of the dirt passage time counter obtained when the recording/reproducing means is moved to a track distant by several tracks.

The optical disc recording/reproducing apparatus may further include: storage means for storing information about the detected dirt; and a dirt number counter for counting the number of times the wobble amplitude signal decreases to a level equal to or smaller than a predetermined ratio within one disc rotation period, wherein the storage means stores an output of the dirt number counter as information which indicates the number of dirt.

The dirt number counter may count the number of times a decrease of the wobble amplitude signal to a level equal to or smaller than a predetermined ratio is detected; and where a time when the wobble amplitude signal is decreased to a level equal to or smaller than the predetermined ratio is a first time point, a time when the wobble amplitude signal exceeds the predetermined ratio after the first time point is a second time point, and a time when the wobble amplitude signal is decreased to a level equal to or smaller than the predetermined ratio again is a third time point, the dirt number counter may not count the number of times at the second time point when a period from the second time point to the third time point is equal to or smaller than a specific time period.

The track may be divided into sectors; the optical disc recording/reproducing apparatus may further include an edge counter for counting the number of sectors; and one rotation of the disc may be detected when an output of the edge counter becomes equal to the number of sectors in a track at which the recording/reproducing means is located.

The recording/reproducing means may include a light source; and in the case where the recording/reproducing means performs a recording/reproducing operation in a track where dirt has been previously detected, an output of light emitted from the light source may be increased for recording or reproduction.

The optical disc recording/reproducing apparatus may further include a dirt passage time counter for measuring a period when the wobble amplitude signal is equal to or smaller than a predetermined ratio, wherein substitute processing is performed when an output of the dirt passage time counter becomes equal to or greater than a specific value during a recording operation in a track where dirt has been previously detected.

The recording/reproducing means may include a light source, and optical means for converging light emitted from the light source at the disc; and the specific value may be a value corresponding to a time period when light emitted from the light source moves over a series of defects, for which a data error can be corrected, when the disc rotates at a reference disc rotation velocity which is used as a reference for recording/reproducing information.

According to an aspect of the present invention, in order to detect dirt within a short span of time before recording of user data is started, features of the dirt adhered on a disc, such as a fingerprint or the like, are detected before performing a recording operation. Further, since examination of all tracks for the presence of a fingerprint adhered on the disc consumes a considerable length of time, a plurality of tracks selected from positions on the disc, which are separated at a generally uniform interval along a radial direction, are examined so as to determine within a short span of time whether or not a fingerprint is adhered on the disc, whereby information about the position of the adhered fingerprint is obtained from a track position at which dirt is detected. Further, the state of the detected dirt is displayed on a monitor screen, or the like, for the purpose of providing a warning. Such an arrangement allows a user to readily find dirt adhered on a disc, such as a fingerprint or the like, and motivates the user to remove the dirt. Furthermore, in the case where the user does not remove the dirt such as a fingerprint or the like, a means is employed to protect user data from damage. For example, the laser power is increased when recording is performed in a region where dirt, such as a fingerprint or the like, has previously been detected.

The present invention is suitable in quantifying dirt information because the output of a wobble amplitude generation section has high dirt detection sensitivity.

According to the present invention, a dirt detection operation is not performed on all tracks on a disc. Thus, a large item of dirt, such as a fingerprint or the like, can be detected within a short period of time.

According to the present invention, a misdetection of dirt, which may be caused due to a variation in the reflectance of a non-dirt substance, can be prevented.

According to the present invention, in a disc, such as a DVD-RAM, wherein the quantity of reflected light is different between a track in a guiding groove and a track in an inter-groove region, a misdetection of dirt which may be caused due to a variation in the quantity of reflected light can be prevented.

According to the present invention, even when the quantity of reflected light is different between a recorded track and an unrecorded track, a misdetection of dirt can be prevented.

According to the present invention, an influence of a variation in the quantity of reflected light due to dirt, which is exerted on a low pass filter output used as a reference for detection of a reflectance variation, can be reduced.

According to the present invention, even when the reflected light is different among address regions, a misdetection of dirt can be prevented.

According to the present invention, even when the output of the low pass filter is not sufficiently stabilized, a misdetection of dirt can be prevented.

According to the present invention, particular means for quantifying information about the size of an item of dirt adhered on a disc can be provided.

According to the present invention, information about an adhesion strength of dirt can be quantified.

According to the present invention, particular means for quantifying information about the number of dirt substances adhered on a disc can be provided.

According to the present invention, a latency time taken until the rotation velocity of a disc becomes a standard velocity can be shortened.

According to the present invention, a single dirt substance which extends over adjacent tracks is prevented from being redundantly detected.

According to the present invention, information about the position of dirt adhered on a disc can be quantified.

According to the present invention, a user can readily locate the presence of the item of dirt.

According to the present invention, a misdetection of dirt information, which may occur when a sufficient level of reflected light cannot be obtained, or when servo abnormality occurs, can be prevented.

According to the present invention, a non-detection of dirt, which may cause servo abnormality, can be prevented.

According to the present invention, even when a detection of dirt cannot be performed due to a number of defects which are initially present in a disc, a misdetection of dirt information can be prevented.

According to the present invention, particular means for warning a user about dirt can be prevented.

According to the present invention, the amount of data which may be lost when recording of data is performed in an area with dirt can be reduced.

BRIEF DESCRIPTION OF THE DRAWINGS

FIG. 21 is a block diagram showing a conventional optical disc recording/reproducing apparatus having a function of detecting dirt, such as a fingerprint or the like.

BEST MODE FOR CARRYING OUT THE INVENTION

In the present specification, a "wobbling" refers to an oscillation of a track in a radial direction of an optical disc having a groove portion and an inter-groove portion.

Figure 1:
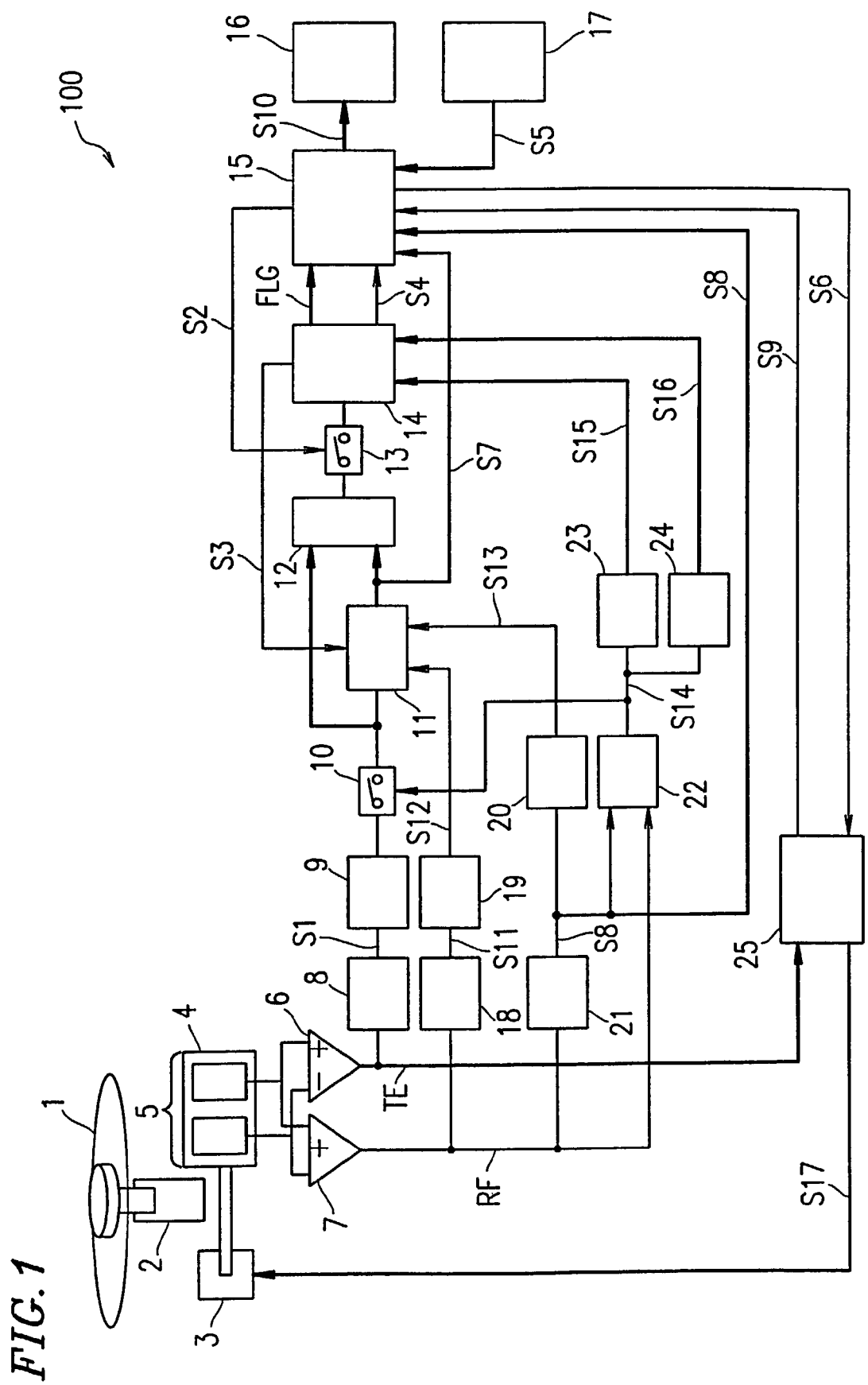
FIG. 1 is a block diagram showing an embodiment of the present invention.

FIG. 1 is a block diagram showing an optical disc recording/reproducing apparatus 100 according to one embodiment of the present invention. In FIG. 1, an optical disc 1 is rotated by a spindle motor 2 at a predetermined rotation rate, and user data is recorded on the optical disc 1 according to the power of a light beam output from a pickup 4. The optical disc 1 is a DVD-RAM disc. A region of the optical disc 1 in which the user data is recorded is divided into a plurality of zones along a radial direction. Each zone is provided in a guiding groove or in a region between grooves, in which the user data can be recorded. Hereinafter, the guiding groove is referred to as a groove track, and the inter-groove region is referred to as a land track. The track of the optical disc 1 is divided into sectors, each of which is a unit of data recording. Each sector has an address region at its head portion. An address for identifying the sector is recorded in the address region.

A traverse motor 3 can move the pickup 4 in a radial direction of the optical disc 1. The pickup 4 incorporates a lens (not shown) for converging a light beam on the optical disc 1, and a two-segment detector 5 which receives the light beam reflected by the optical disc 1. The two-segment detector 5 converts the received light beam into electric signals, and outputs the electric signals to a differential amplifier 6 and an adder 7, respectively. The differential amplifier 6 obtains a difference between the two signals output from the two-segment detector 5. An output of the differential amplifier 6 is input to a servo controller 25 and a wobble amplitude detection circuit 8, which will be described later, as a tracking error signal TE which is used for tracking control such that the light beam is allowed to follow the track.

On the other hand, the adder 7 obtains a sum of the two signal input from the two-segment detector 5. An output of the adder 7 is input to a reproduction signal amplitude detection circuit 18, a signal reproduction circuit 21, and an ID gate generation circuit 22, which will be described later, as a reproduction signal RF which is used for reproduction of data. A wobble amplitude detection circuit 8 extracts, from the tracking error signal, a frequency component corresponding to a specific frequency at which the track of the optical disc 1 oscillates (wobbling), and outputs a wobble amplitude signal S1 which indicates an envelope of the frequency component to an A/D converter 9. Operation of the wobble amplitude detection circuit 8 will be described later in detail. The A/D converter 9 is an element which converts an analog input signal of 0 V to 3 V into a digital signal of 8 bits. The A/D converter 9 converts the input wobble amplitude signal S1 to a numerical value, and output the numerical value to a switch 10. The switch 10 performs an On/Off switching operation according to the level (HorL) of a control signal S14 output by the ID gate generation circuit 22, which will be described later. On/Off conditions for the switch 10 will also be described later.

An output of the switch 10 is input to an LPF control section 11 and a variation rate detection circuit 12. Details of operation of the LPF control section 11 and the variation rate detection circuit 12 are described later. The LPF control section 11 includes a plurality of low pass filters (LPFs). Outputs of the low pass filters are switched according to a plurality of control signals. A low band component of a signal input through the switch 10 is output to the variation rate detection circuit 12 and a microcomputer 15, which will be described later. The plurality of control signals input to the LPF control section 11 will be described later. The variation rate detection circuit 12 performs an operation of dividing the signal input through the switch 10 by a signal output from the LPF control section 11. An output of the variation rate detection circuit 12 is input to the switch 13. The switch 13 performs an On/Off switching operation according to the level (H or L) of a control signal S2 output by the microcomputer 15. On/Off conditions for the switch 13 will also be described later.

An output of the switch 13 is input to a DSP 14. The DSP 14 is a processor incorporating a memory. The DSP 14 operates when the switch 13 is on. Further, outputs of an edge counter 23 and a period counter 24 are input to the DSP 14. The DSP 14 outputs to an LPF control section 11 a binary fingerprint detection signal S3 which becomes high (H) when it is detected from a process performed inside the DSP 14 that the light beam is scanning over dirt, such as a fingerprint or the like, and becomes low (L) otherwise. The fingerprint detection signal S3 is one of a plurality of control signals input to the LPF control section 11. The LPF control section 11 selects among outputs of a plurality of low pass filters according to the level (H or L) of the fingerprint detection signal S3 using switches incorporated therein and outputs the selected output(s). Furthermore, the DSP 14 outputs to the microcomputer 15 a flag FLG which indicates the process currently being performed, and the information S4 stored in the memory incorporated in the DSP 14. Details of the operation of the DSP 14 will be described later using a flowchart.

The microcomputer 15 inputs an address S5 of a specific sector of a track to be examined with respect to whether dirt, such as a fingerprint or the like, is present on a surface of the optical disc 1. Herein, the address S5 is obtained from a track information generation section 17. The microcomputer 15 outputs through a servo controller 25 a control signal S6 for operating a traverse motor 3.

Furthermore, the microcomputer 15 outputs to a control terminal (not shown) of the switch 13 a control signal S2 for switching the On/Off state of the switch 13 according to a value S7 from the LPF control section 11 and the flag FLG from the DSP 14. The microcomputer 15 receives an address S8 of a sector which is currently being scanned by the light beam for reproduction in the signal reproduction circuit 21, which will be described later.

Furthermore, the microcomputer 15 receives a servo abnormality detection signal S9, which is output by the servo controller 25 (described later) in response to a detection of abnormality in servo control. The microcomputer 15 outputs to a display section 16 fingerprint detection information S10, which indicates characteristics of dirt adhered on the optical disc 1, such as a fingerprint or the like, according to the information S4 obtained from the memory of the DSP 14, the servo abnormality detection signal S9 input from the servo controller 25, or the like. Details of the operation of the microcomputer 15 are also described later using a flowchart.

The display section 16 displays the fingerprint detection information S10 input from the microcomputer 15 in a predetermined display form. The reproduction signal amplitude detection circuit 18 detects an envelope of a reproduction signal RF input from the adder 7, and outputs the envelope as a reproduction amplitude signal S11 to a recording region detection circuit 19. The recording region detection circuit 19 applies a specific slice level to the reproduction amplitude signal S11 so as to generate a signal recorded portion/unrecorded portion switching signal S12, which is a binary signal of two levels (H and L), and outputs the signal S12 to the LPF control section 11. The recorded portion/unrecorded portion switching signal S12 is one of a plurality of control signals input to the LPF control section 11. The LPF control section 11 selects among outputs of a plurality of low pass filters according to the level (H or L) of the recorded portion/unrecorded portion switching signal S12 using switches incorporated therein and outputs the selected output(s).

Furthermore, the signal reproduction circuit 21 converts the address S8 of a sector which is currently being scanned by the light beam, which is obtained from the reproduction signal RF input from the adder 7, intonumerical information, and outputs the numerical information to the microcomputer 15, an L/G determination circuit 20, and the ID gate generation circuit 22. The L/G determination circuit 20 determines based on the input address S8 whether the sector which is currently scanned by the light beam is present in a land track or a groove track, and outputs to the LPF control section 11 a land/groove switching signal S13 which becomes high (H) during scanning of a sector in a land track. The land/groove switching signal S13 is one of a plurality of control signals input to the above described LPF control section 11. The LPF control section 11 selects among outputs of a plurality of low pass filters according to the level (H or L) of the land/groove switching signal S13 using switches incorporated therein and outputs the selected output(s).

The ID gate generation circuit 22 outputs an ID gate signal S14, which is high (H) when the light beam passes over an address region and low (L) when the light beam passes over a region other than the address region, to a control terminal which performs On/Off control of the switch 10, the edge counter 23, and the period counter 24, according to the reproduction signal RF input from the adder 7, the numerical information of the address S8 of the sector which is currently being scanned by the light beam, which is input from the signal generation circuit 21, and an output of an internal counter. The switch 10 is structured so as to be turned off when a H level signal is input to the control terminal. That is, the switch 10 is off when the light beam is present over the address region, and the ID gate signal S14 is at a high (H) level.

The edge counter 23 is a counter which increments in response to a rising edge of the ID gate signal S14 at which the signal S14 goes to the H level. A value S15 counted by the edge counter 23 is output to the DSP 14.

The period counter 24 performs counting using a special clock which incorporates a time from a falling edge of the ID gate signal S14 to the L level to an input of a next falling edge, and outputs a counted value S16 to the DSP 14.

The servo controller 25 receives a focus error signal (not shown in FIG. 1) to perform focusing control, and performs tracking control according to a tracking error signal TE which is input from the differential amplifier 6. Further, the servo controller 25 performs access control based on the control signal S6 input from the microcomputer 15 to output to the traverse motor 3 a drive signal S17 for moving a pickup 4 in the radial direction of the optical disc 1.

Furthermore, the servo controller 25 performs a servo abnormality operation by comparing the level of the tracking error signal TE with a specific level to detect, and outputs a binary servo abnormality detection signal S9, which is high (H) when a servo abnormality occurs and low (L) when a servo operation is performed normally, to the microcomputer 15.

Figure 2:
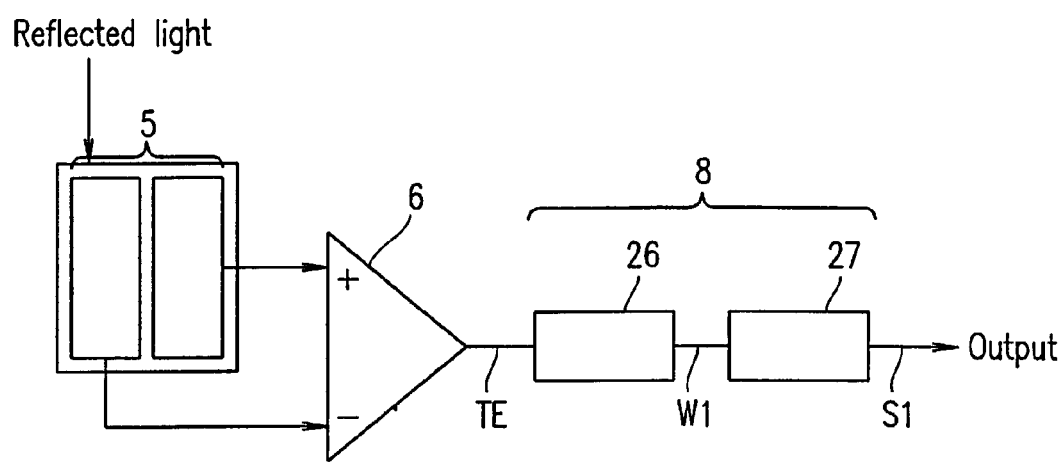
FIG. 2 is a block diagram showing a structure of a wobble amplitude detection circuit 8 of FIG. 1.

Next, a structure of the wobble amplitude detection circuit 8 is described using FIG. 2. FIG. 2 is a block diagram showing the structure of the wobble amplitude detection circuit 8 of FIG. 1. As described above, the light beam reflected by the optical disc 1 is received by the two-segment detector 5, and output to the differential amplifier 6 as signals, and a difference of the two signals input to the differential amplifier 6 is output to the wobble amplitude detection circuit 8 as a tracking error signal TE. In FIG. 2, the band pass filter 26 extracts, from the tracking error signal TE input from the differential amplifier 6, a specific frequency component, and outputs the extracted specific frequency component. The output of the band pass filter 26 is input to an envelope detection circuit 27. The envelope detection circuit 27 outputs a wobble amplitude signal S1 which indicates an envelope of an input signal.

Herein, the tracking error signal TE output by the differential amplifier 6 is a signal used for tracking control commonly performed in optical disc apparatuses. In an optical disc such as a DVD-RAM, a track is formed so as to have an oscillation (wobbling) at a specific frequency. Thus, the output of the differential amplifier 6 includes a variation caused due to the oscillation of the track, i.e., wobbling. The band pass filter 26 extracts from the output of the differential amplifier 6 only a frequency component which is generated by the oscillation of the track. (In the case where, in a DVD-RAM disc having a capacity of 4.7 Gbytes, the light beam moves at a predetermined linear velocity which is defined for recording/reproduction of data on the disc, the frequency component is 314 kHz.) The wobble amplitude signal S1 output by the envelope detection circuit 27 represents the amplitude of the output of the band pass filter 26. That is, the wobble amplitude signal S1 represents the amplitude of an extracted wobbling component signal.

In the case where dust or dirt, such as a fingerprint or the like (hereinafter, simply referred to as "fingerprint"), is adhered on the optical disc 1, the light beam is scattered by the fingerprint before reaching an information recording plane of the optical disc 1, and the scattered light beam component returns to the two-segment detector 5. The scattered light beam is removed by the differential detector 6 An unscattered component of the light beam is reflected by the optical disc land received by the two-segment detector 5. The output of the two-segment detector 5, which received the unscattered component of the light beam, is reduced in comparison to a case where the fingerprint is not adhered. As the output of the two-segment detector 5 is decreased, the output of the differential amplifier 6 is decreased. As a result, the output of the wobble amplitude detection circuit 8 is also decreased. That is, the level of the wobble amplitude signal is decreased when the light beam is passing over the fingerprint.

Figure 3:
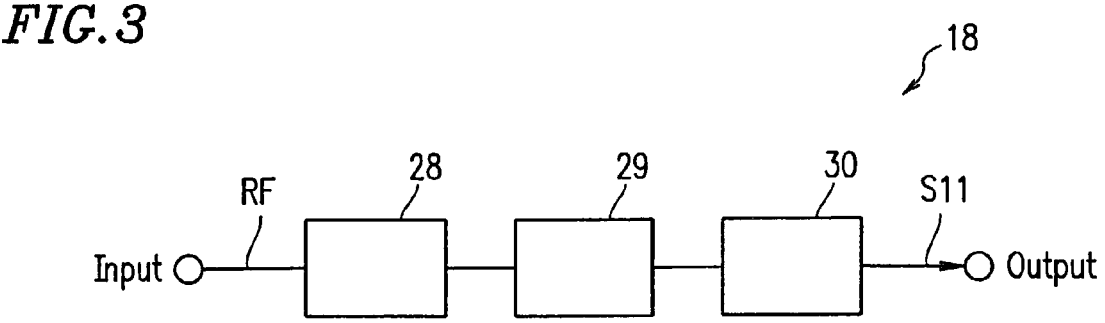
FIG. 3 is a block diagram showing a structure of a reproduction signal amplitude detection circuit 18 of FIG. 1.

Next, a structure of the reproduction signal amplitude detection circuit 18 is described using FIG. 3. In FIG. 3, an amplifier 28 having a constant amplification rate amplifies the reproduction signal RF, which is input from the adder 7, at a specific amplification rate, and outputs the amplified signal. The signal amplified by the amplifier 28 is input to a clamp circuit 29. The clamp circuit 29 clamps the lower level of the input signal with a specific voltage. An output of the clamp circuit 29 is input to a demodulation circuit 30. The demodulation circuit 30 demodulates a peak voltage of the input signal whose lower level is clamped, and outputs a reproduction amplitude signal S11. That is, the reproduction signal amplitude detection circuit 18 outputs a signal corresponding to an AC amplitude of the amplified reproduction signal RF.

In the case of a rewritable optical disc represented by a DVD-RAM disc, the disc has a region in which data has been recorded and a region in which data is not recorded. The positions of these regions cannot be specified because they are different among optical discs. The recording region detection circuit 19 uses the reproduction amplitude signal S11 input from the reproduction signal amplitude detection circuit 18 to generate the recorded portion/unrecorded portion switching signal S12, based on which it can be determined whether a track which is currently being scanned by the light beam is a region in which data has been recorded or an unrecorded region.

Figure 4:
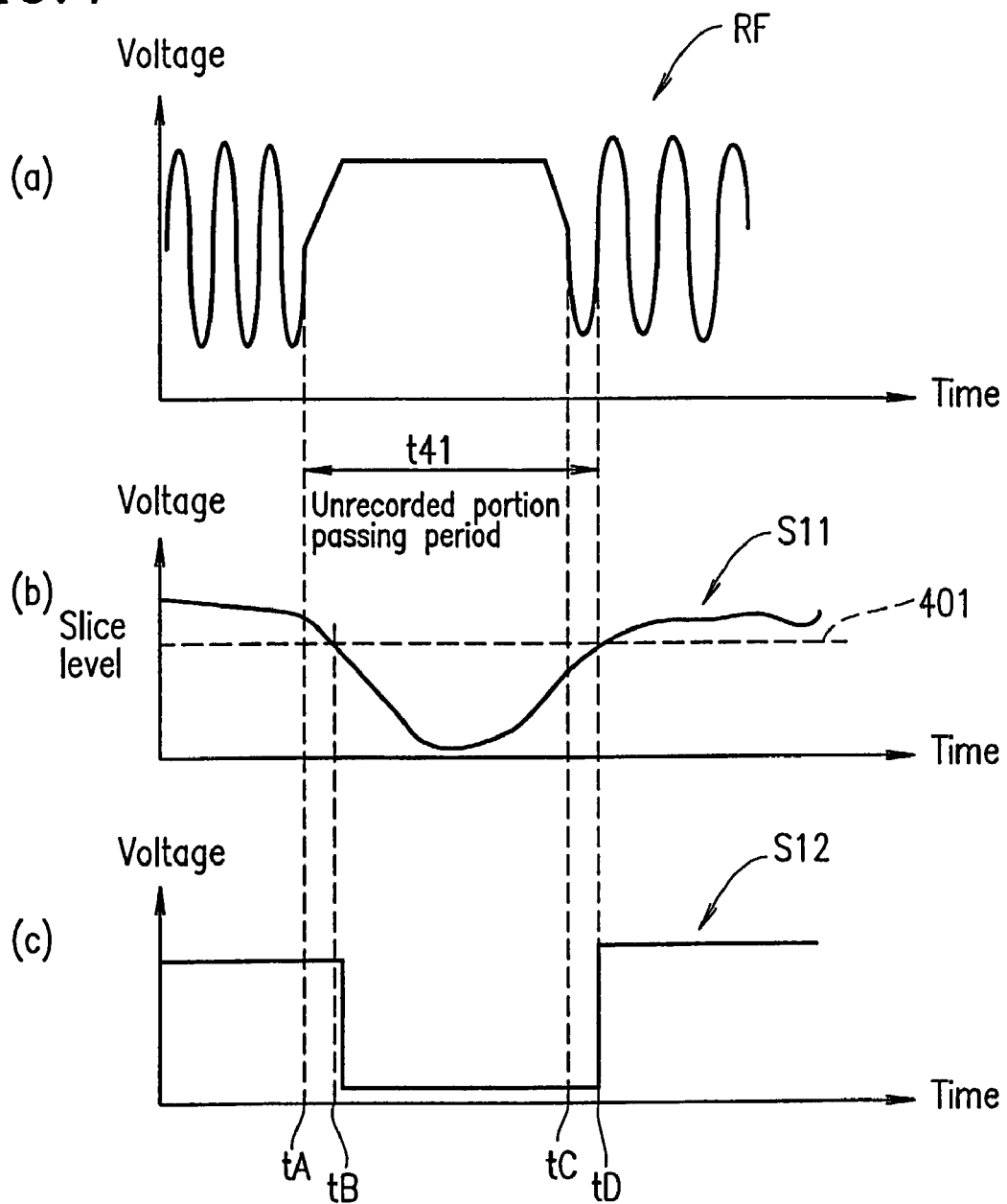
FIGS. 4(a) through 4(c) illustrate an operation of a recording region detection circuit 19 of FIG. 1.

Operation of the recording region detection circuit 19 is described using FIGS. 4(a) through 4(c). FIG. 4(a) shows a waveform of the reproduction signal RF input from the adder 7 to the reproduction signal amplitude generation circuit 18, where the vertical axis represents voltage, and the horizontal axis represents time. The broken lines shown in the drawing indicate synchronism among FIGS. 4(a) through 4(c). A region of the optical disc in which a recording mark is formed has a reflectance different from that of a region in which no recording mark is formed, and therefore, modulation occurs in the region of the optical disc in which a recording mark is formed. Modulation does not occur in the region in which no recording mark is formed because reflectance does not change. Period t41 from time tA to time tD shown in FIGS. 4(a) through 4(c) represents a time period when the light beam is passing over the region in which data is not recorded.

FIG. 4(b) shows a reproduction amplitude signal S11, which is output by the reproduction signal amplitude generation circuit 18 when the reproduction signal RF shown in FIG. 4(a) is input to the reproduction signal amplitude generation circuit 18. In period t41 corresponding to an unrecorded region in which data is not recorded, the reproduction amplitude signal S11 is at a low level as shown in FIG. 4(b), because the DC component is clamped by the clamp circuit 29. The recording region detection circuit 19 incorporates a comparator. The recording region detection circuit 19 outputs a high (H) level signal, which indicates a recorded region, when the signal S11 is higher than the slice level represented by a thick broken line 401 in FIG. 4(b), and outputs a low (L) level signal, which indicates an unrecorded region, when the signal S11 is lower than the slice level in FIG. 4(b).

FIG. 4(c) shows the recorded portion/unrecorded portion switching signal S12 output from the recording region detection circuit 19. Since the reproduction amplitude signal S11 of FIG. 4(b) is equal to or lower than the slice level 401 during a period from time tB to time tD, the recording region detection circuit 19 outputs a low (L) level signal. When the recorded portion/unrecorded portion switching signal S12 is high (H), a region currently being scanned by the light beam is a recorded region. When the recorded portion/unrecorded portion switching signal S12 is low (L), a region currently being scanned by the light beam is an unrecorded region.

Figure 5:
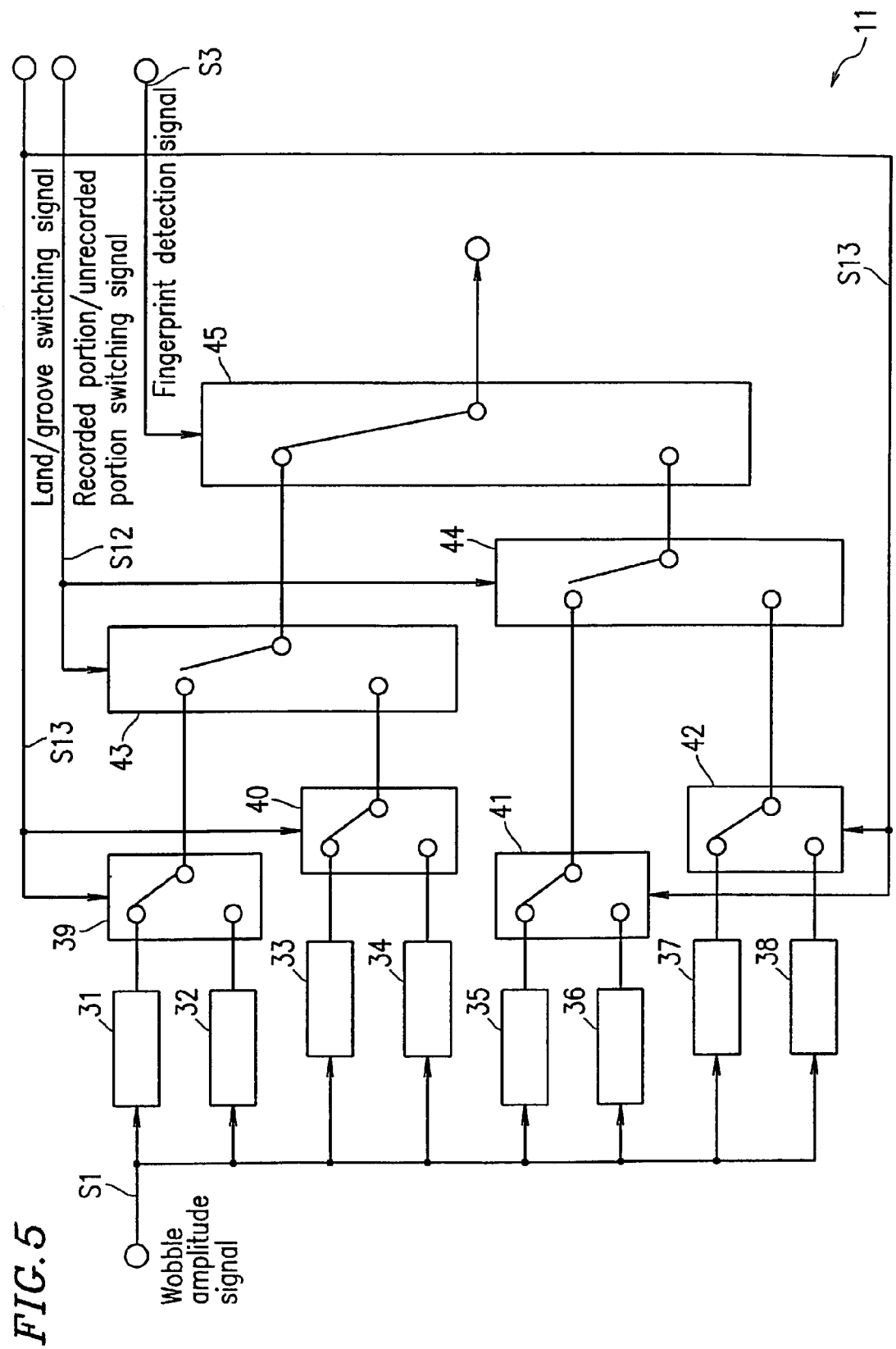
FIG. 5 is a block diagram showing a structure of an LPF control section 11 of FIG. 1.
Figure 6:
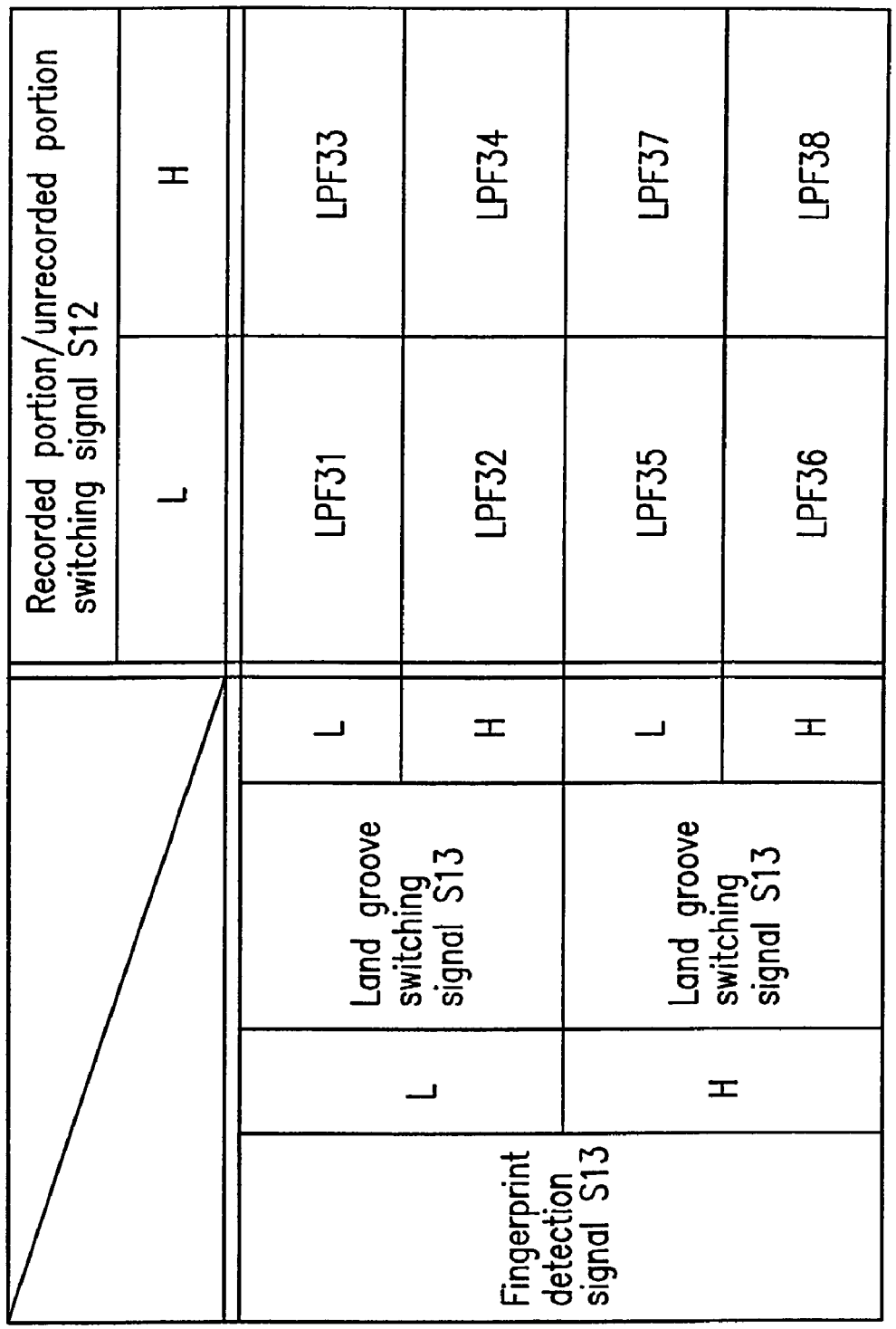
FIG. 6 illustrates an operation of the LPF control section 11 of FIG. 1.

Next, a structure and operation of the LPF control section 11 are described using FIGS. 5 and 6. In FIG. 5, the LPF control section 11 incorporates 8 low pass filters (LPF). LPF 31, LPF 32, LPF 33, and LPF 34 are identical filters each having a cutoff frequency of 100 Hz. LPF 35, LPF 36, LPF 37, and LPF 38 are identical filters each having a cutoff frequency of 25 Hz. Inputs to the LPFs are connected to a common terminal. The wobble amplitude signal S1 output by the wobble amplitude detection circuit 8 is input through the switch 10 to the LPFs.

Outputs of the LPF 31 and the LPF 32 are input to the switch 39. Outputs of the LPF 33 and the LPF 34 are input to the switch 40. Outputs of the LPF 35 and the LPF 36 are input to the switch 41. Outputs of the LPF 37 and the LPF 38 are input to the switch 42. Each terminal of switch 39, switch 40, switch 41, and switch 42, which determines a switching of its input, receives the land/groove switching signal S13 output by the L/G determination circuit 20.

The switch 39, switch 40, switch 41, and switch 42 are connected to the outputs of the LPF 31, LPF 33, LPF 35, and LPF 37 when the land/groove switching signal S13 is at a low (L) level, i.e., when a track currently scanned by the light beam is a land track. The switch 39, switch 40, switch 41, and switch 42 are connected to the outputs of the LPF 32, LPF 34, LPF 36, and LPF 38 when the land/groove switching signal S13 is at a high (H) level, i.e., when a track currently scanned by the light beam is a groove track.

Next, the outputs of the switch 39 and the switch 40 are input to a switch 43, and the outputs of the switch 41 and the switch 42 are input to a switch 44. Terminals of the switch 43 and the switch 44, which control input switching, receive the recorded portion/unrecorded portion switching signal S12 output from the recording region detection circuit 19. When the recorded portion/unrecorded portion switching signal S12 is at a high (H) level, i.e., when a track currently scanned by the light beam is a recorded region, the switch 43 and the switch 44 are connected to the outputs of the switch 40 and the switch 42, respectively. When the recorded portion/unrecorded portion switching signal S12 is at a low (L) level, i.e., when a track currently scanned by the light beam is an unrecorded region, the switch 43 and the switch 44 are connected to the outputs of the switch 39 and the switch 41, respectively.

Next, the outputs of the switch 43 and the switch 44 are input to a switch 45. A terminal of the switch 45 which controls switching of its input receives a fingerprint detection operation signal S3 output from the DSP 14. The condition for outputting the fingerprint detection operation signal S3 will be described later. The fingerprint detection operation signal S3 is a binary signal which becomes high (H) when it is detected by the DSP 14 that the light beam is passing over a fingerprint adhered on the optical disc 1. When the fingerprint detection operation signal S3 is high (H), the switch 45 is connected to the output of the switch 44. When the fingerprint detection operation signal S3 is low (L), the switch 45 is connected to the output of the switch 43.

FIG. 6 is a table which illustrates the selection of low pass filters which is achieved by the switches. When the light beam is positioned in an unrecorded land track on which no fingerprint is adhered, the fingerprint detection operation signal S3 is low (L), the recorded portion/unrecorded portion switching signal S12 is low (L), and the land/groove switching signal S13 is low (L), as shown in FIG. 6. Thus, the output of the LPF 31 is selected as the output of the LPF control section 11. When the light beam is positioned in a recorded groove track on which a fingerprint is adhered, the fingerprint detection operation signal S3 is high (H), the recorded portion/unrecorded portion switching signal S12 is high (H), and the land/groove switching signal S13 is high (H),as shown in FIG. 6. Thus, the output of the LPF 38 is selected as the output of the LPF control section 11. Subsequently, an output of the LPF control section 11 is selected from the outputs of the low pass filters according to the state of a track currently scanned by the light beam.

Herein, the wobble amplitude signal S1 output from the wobble amplitude detection circuit 8 is a signal generated from light reflected by the optical disc 1. However, the output level of the wobble amplitude signal S1 is different between a case where the light is reflected by a land track and a case where the light is reflected by a groove track. The output level of the wobble amplitude signal S1 is also different between a case where the light is reflected by a recorded region and a case where the light is reflected by an unrecorded region. Since a region in which data has been recorded has a reflectance lower than that of a region where no recording mark is formed, the quantity of light reflected by the region in which data has been recorded is different from that of the light reflected by an unrecorded region. That is, the output of the light beam received by the two-segment detector 5 is changed, and as a result, the output level of the wobble amplitude detection circuit 8 is changed. The output of the LPF control section 11 is used as a reference in a fingerprint detection process which will be described later. The above variation of the output levels results in a variation in the output of the LPF control section 11. This means that the reference used for fingerprint detection is variable. However, an abrupt change in the output level, which may occur immediately after the light beam moved from a land track to a groove track, for example, cannot be followed by an output of a low pass filter which has a cutoff frequency of about 100 Hz. Thus, the probability that a fingerprint is erroneously detected, or that a fingerprint is not detected, immediately after this switching of the tracks, is decreased.

In order to avoid this problem, a plurality of low pass filters are provided in the LPF control section 11, outputs from the low pass filters are switched immediately after the light beam is moved from a land track to a groove track, whereby a fingerprint can be detected without being influenced by a variation of an abrupt output level. For the same reasons as these above, the outputs of the low pass filters are switched between a recorded region and an unrecorded region.

Furthermore, as described above, the output of the wobble amplitude signal is decreased when the light beam is scanning a fingerprint. Since an influence caused by a decrease in the output due to a fingerprint on a reference value used for fingerprint detection has to be reduced, an output of a low pass filter having a low cutoff frequency of about 25 Hz is used in the present invention as a reference value such that the output level is not varied during detection of a fingerprint.

All of the low pass filters shown in FIG. 5 are digital filters having delay elements. The switch 45 is switched to the output of the switch 44 when the light beam passes over a fingerprint, and in such a case, the outputs of the LPF 31, LPF 32, LPF 33, and LPF 34 are switched to the outputs of the LPF 35, LPF 36, LPF 37, and LPF 38, such that outputs of the low pass filter of different bands are continuously connected.

An effect obtained when one of the outputs of the low pass filters in the LPF control section 11 are used as a reference will be described in a section where operation of the variation rate detection circuit 12 is described.

Figure 7:
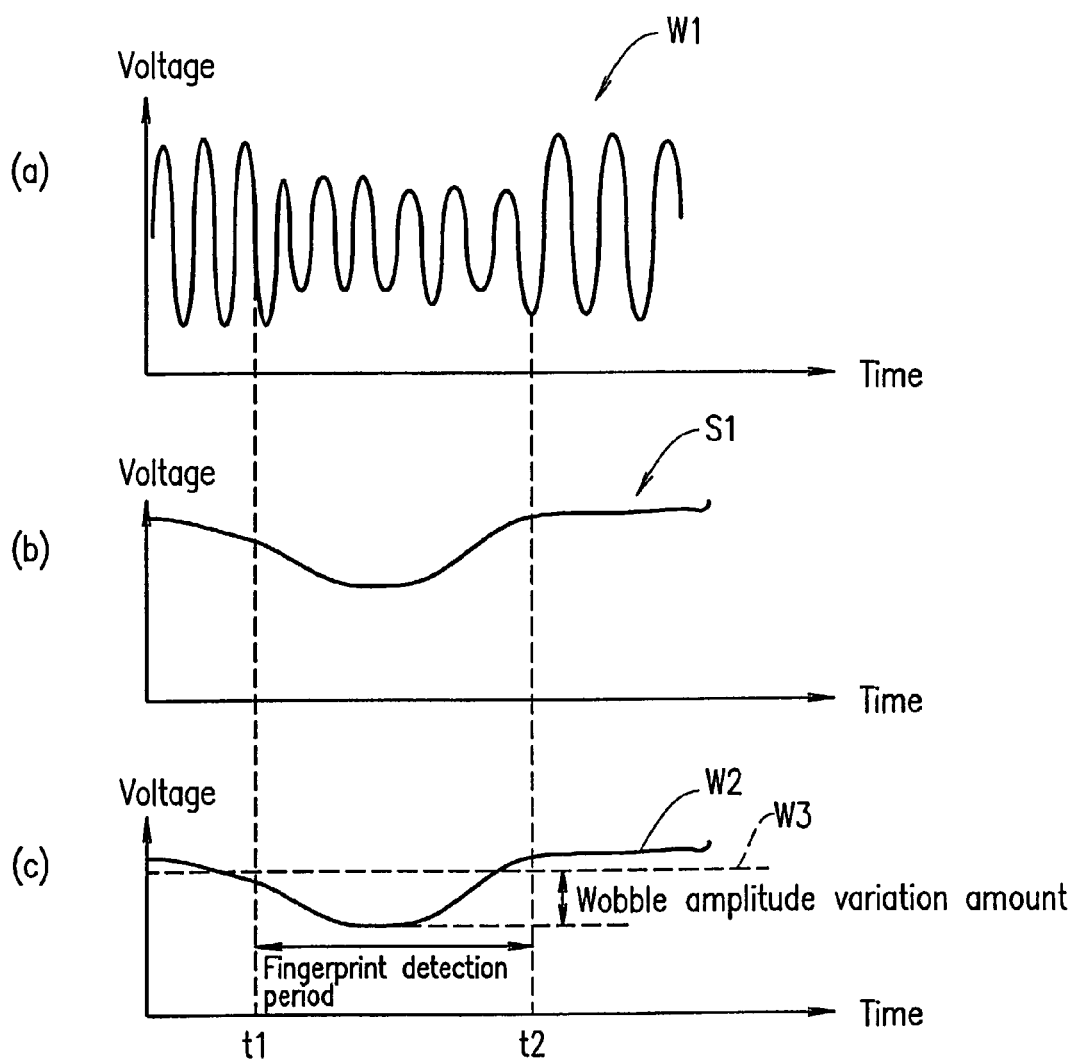
FIGS. 7(a) through 7(c) illustrate a process of fingerprint detection in a variation rate detection circuit 12 of FIG. 1.

Next, a fingerprint detection process performed in the variation rate detection circuit 12 is described using FIGS. 7(a), 7(b), and 7(c). Considering that the wobble amplitude signal S1 decreases when the light beam passes over a fingerprint, the fingerprint can be detected by calculating a rate of decrease of the wobble amplitude signal S1. The rate of decrease of the wobble amplitude signal S1 can be obtained by dividing a wobble amplitude signal, which is input when the light beam passes over a fingerprint, by the level (reference level) of the wobble amplitude signal which is obtained when the light beam does not pass over a fingerprint. The variation rate detection circuit 12 performs the above division operation to calculate a rate of decrease of the wobble amplitude signal S1.

FIG. 7(a) shows an output waveform W1 of the band pass filter 26 (FIG. 2), where the horizontal axis represents time, and the vertical axis represents voltage. FIG. 7(b) shows a waveform of the wobble amplitude signal S1 which is output from the envelope detection circuit 27 (FIG. 2) when the output waveform W1 shown in FIG. 7(a) is input to the envelope detection circuit 27. In the case where the light beam passes over a fingerprint during a period from time t1 to time t2, the output level of the wobble amplitude signal S1 is decreased as shown in FIG. 7(b). The variation frequency component with decreased output level is about several kilohertz.

The width of a track and the edge angle of a groove of a track vary during production of the optical disc 1, and due to such variations, the wobble amplitude signal S1 generated from an oscillation component of the track formed in the optical disc 1 varies. The variation of the wobble amplitude signal S1 is a variation factor which is independent from presence/absence of a fingerprint. Hereinafter, this variation is referred to as an "in-plane variation". The in-plane variation varies at a frequency such that the value of the wobble amplitude signal S1 changes but restores the same value after one rotation of the optical disc 1. That is, the in-plane variation varies at a rotation frequency of the optical disc 1. The reference value used for the decrease rate of the wobble amplitude signal S1 must be allowed to follow the rotation frequency of the optical disc 1, but not to follow a variation frequency caused by a fingerprint. To this end, an output of a low pass filter in the LPF control section 11, which passes the band of the rotation frequency of the optical disc 1, is used as a reference value for detecting a variation in the wobble amplitude.

An effect of the thus-selected reference value is described. In the case of a DVD-RAM disc having a capacity of 4.7 Gbytes, the rotation frequency of the optical disc 1 is about 22 Hz to 55 Hz, and the variation frequency of wobble amplitude signal S1 which is caused due to a fingerprint is about several hundreds of hertz (Hz) to several tens of kilohertz (kHz). Since the LPF 31, LPF 32, LPF 33, and LPF 34 in the LPF control section 11 have a cutoff frequency of 100 Hz, these filters pass the above-described in-plane variation component, which varies at the rotation frequency of the optical disc 1, but does not pass the variation frequency component of the wobble signal amplitude which is caused due to a fingerprint. Thus, each of the outputs of the LPF 31, LPF 32, LPF 33, and LPF 34 can be used as a reference for a case where the light beam passes over a region on which a fingerprint is not adhered. However, when the light beam passes over a fingerprint, the low pass filter passes a portion of a variation component of about several hundreds of hertz due to the fingerprint. In order to reduce an effect of such unintended passing, outputs of the LPF 35, LPF 36, LPF 37, and LPF 38 having a cutoff frequency of about 25 Hz are used as a reference when the light beam passes over a fingerprint.

In FIG. 7(a), the waveform W2 represents an output of the A/D converter 9 when the wobble amplitude signal shown in FIG. 7(b) is input to the A/D converter 9, and the waveform W3 represents an output of the LPF control section 11 when the waveform W2 is input to the LPF control section 11. During a period from time t1 to time t2, a variation of the wobble amplitude signal S1 shown in FIG. 7(b) occurs in a high band of several kilohertz as described above. Thus, an output of the LPF control section 11 does not follow this variation, and accordingly, a constant value shown by the waveform W3 is output.

Based on the output of the low pass filter shown by the waveform W3, the variation rate detection circuit 12 detects a rate of a variation in the signal having the waveform W2 as a variation rate which is caused due to a fingerprint. This is described with specific numbers below.

Consider that the level of the wobble amplitude signal S1 which is output from the wobble amplitude detection circuit 8 when a fingerprint is not adhered on the optical disc 1 is in the vicinity of 1 V. The wobble amplitude signal S1 output by the wobble amplitude detection circuit 8 is 800 mV due to an in-plane variation of the wobble amplitude. In this case, a value output from the A/D converter 9 is also a value indicating 800 mV. (Herein, a value indicating a voltage is used in place of a digital value, for simplicity of description.) Thus, a value input to the LPF control section 11 is also a value indicating 800 mV. Since the variation frequency of the in-plane variation is about 22 Hz, and the cutoff frequency of the low pass filter in the LPF control section 11 before a fingerprint is detected is 100 Hz, the output of the LPF control section 11 follows the in-plane variation, and therefore becomes a value indicating 800 mV. In this case, the variation rate detection circuit 12 outputs a value of 800/800=1. Thus, a decrease in the output of the wobble amplitude signal S1 which is caused due to the in-plane variation is not detected.

Consider that, when the light beam passes over a region in which a fingerprint is adhered, the wobble amplitude signal S1 output by the wobble amplitude detection circuit 8 is reduced by 30% to 560 mV in a variation range of 2 kHz. The output of the LPF control section 11 cannot follow this variation band, and therefore outputs a value indicating 800 mV. Thus, based on a calculation of 560/800=0.7, the variation rate detection circuit 12 detects and outputs a value of 0.7 which indicates a 30% decrease in the wobble amplitude signal S1.

Figure 8:
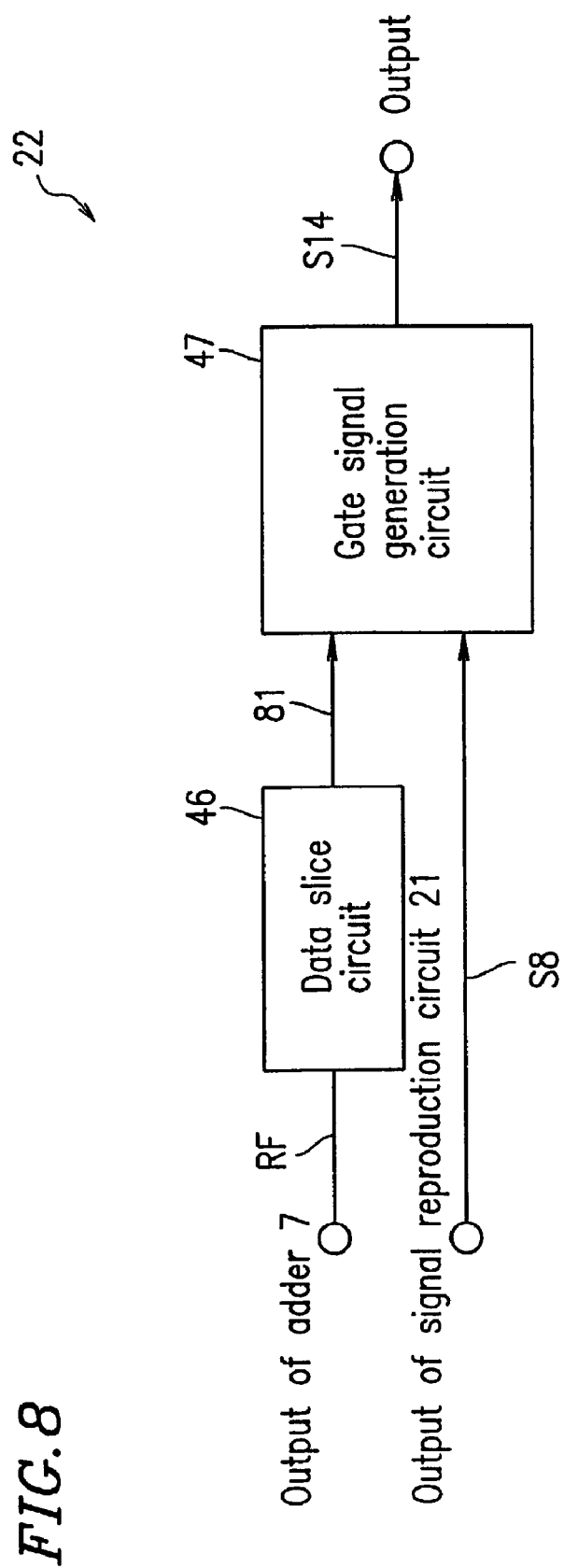
FIG. 8 is a block diagram showing a structure of an ID gate generation circuit 22 of FIG. 1.
Figure 9:
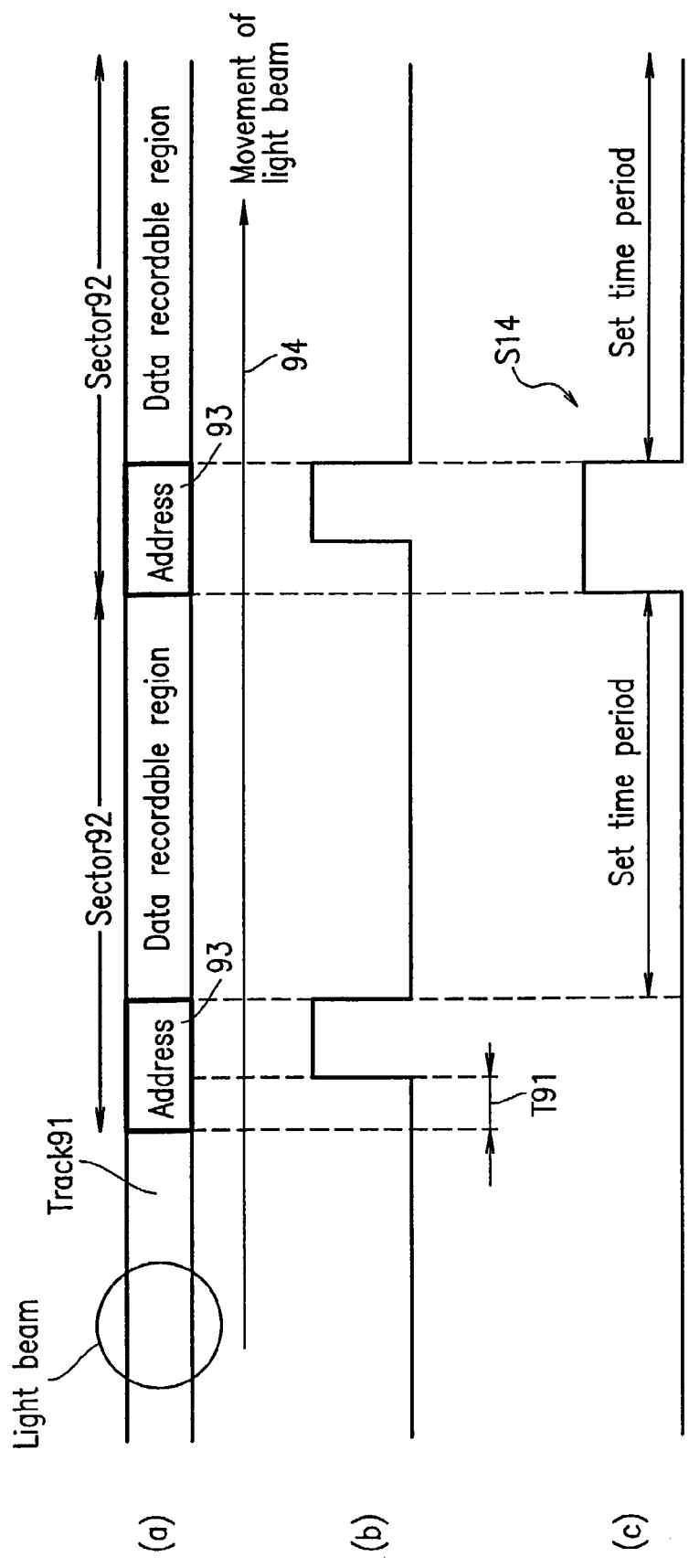
FIGS. 9(a) through 9(c) illustrate an operation of the ID gate generation circuit 22 of FIG. 1.

Next, operation of the ID gate generation circuit 22 is described using FIGS. 8 and 9. FIG. 8 shows a structure of the ID gate generation circuit 22. The reproduction signal RF output from the adder 7 (FIG. 2) is input to a data slice circuit 46 of FIG. 8. In a DVD-RAM disc, an address region is different from a data recordable region in that address information is recorded in the form of pits wherein the pits are formed in a staggered pattern over a land track and groove track. Thus, a DC component of the reproduction signal RF is different between a data recordable region and an address region, such that the DC component is output at a higher level in the address region. The data slice circuit 46 binarizes the DC component of the reproduction signal RF input from the adder 7 with respect to a specific slice level, so as to output to the gate signal generation circuit 47 a signal which is at a high (H) level when the light beam is passing over the address region. The gate signal generation circuit 47 incorporates a counter. The gate signal generation circuit 47 counts using a reference clock, which is generated by an incorporated quartz oscillator, a period from a time when a falling edge of the signal input from the data slice circuit 46 is input to the gate signal generation circuit 47 to a time when the light beam reaches a next address region, so as to output a signal which rises to a high (H) level when the light beam reaches a position immediately before the next address region, and which falls to a low (L) level when the light beam reaches a data recordable region.

The gate signal generation circuit 47 receives an address S8 of a sector, which is reproduced by the signal reproduction circuit 21, and at which the light beam is present. The gate signal generation circuit 47 calculates from the input address S8 a deviation rate of the time of a reference clock which is used for data reproduction from a reference value. (The reference clock is about 58.4 MHz in the case of a DVD-RAM disc having a capacity of 4.7 Gbytes which is rotating at a reference linear velocity for recording or reproduction.) The count value of the clock generated by the above-described quartz oscillator is corrected. Thus, even when the disc rotation velocity is different from a reference rotation velocity for recording or reproduction, a gate signal, which rises to a high (H) level immediately before the light beam passes over the address region which is present at the head of a next sector, can be generated.

Next, operation of the ID gate generation circuit 22 is described using a timing chart of FIG. 9. FIGS. 9(a), 9(b), and 9(c) schematically illustrate the light beam moving along a track on a rotating disc. The track 91 is uniformly divided by units of a sector 92. At the head of a sector 92, an address 93 for identifying data of the sector is recorded. A timing chart for an output 81 of the data slice circuit 46, and a timing chart of an ID gate signal S14 output by the gate signal generation circuit 47, which are obtained when the light beam moves along a direction indicated by an arrow 94 of FIG. 9(a) at a constant velocity, are shown in FIGS. 9(b) and 9(c), respectively.

When the light beam is present in a region of an address 93, and a variation in a DC level of the reproduction signal RF is detected, the output of the data slice circuit 46 becomes high (H) as shown in FIG. 9(b). At this time, the signal of FIG. 9(b) becomes high (H) after a time delay shown by a period T91 from the head of the address region due to a detection delay in the data slice circuit 46. As shown in FIG. 9(c), the gate signal generation circuit 47 corrects a value counted using a clock of a quartz oscillator, based on the address S8 reproduced by the signal reproduction circuit 21, according to a variation rate of a reference clock which is used for recording or reproduction on a disc. The gate signal generation circuit 47 outputs a low (L) signal when the light beam reaches a data recordable region. Thereafter, a predetermined time until the light beam reaches an address region at the head of a next sector is counted, and the ID gate generation circuit 22 outputs an ID gate signal S14 which becomes high (H) after the predetermined time has elapsed.

Thus, the ID gate generation circuit 22 can accurately output a signal which becomes high (H) when the light beam is present in an address region, even if the rotation velocity of the disc is different from a reference rotation speed which is a reference for data recording or reproduction. Since in the address region, pits are formed in a staggered pattern as described above, an output of the tracking error signal TE is different from that in a data recordable region. Thus, when the light beam is passing over the address region, the wobble amplitude signal S1 output by the wobble amplitude detection circuit 8 is different from that obtained when the light beam is passing over the data recordable region. In order to prevent an influence of a variation in the output of the wobble amplitude detection circuit 8 from being exerted on an input of the LPF control section 11, the switch 10 is turned off during a period when the ID gate signal S14 output by the ID gate generation circuit 22 is high (H), and the output of the wobble amplitude detection circuit 8 is not input to the LPF control section 11 when the light beam is passing over the address region.

Next, operation of the edge counter 23 is described. The edge counter 23 is a counter which increments at every input of a rising edge of the ID gate signal S14 output from the ID gate generation circuit 22. In a DVD-RAM disc having a capacity of 4.7 Gbytes, a recordable track is divided into 35 zones along a radial direction. The number of sectors through which the light beam passes during one rotation of the optical disc is set for each zone. For example, the outermost zone, ZONE 34, includes 59 sectors for one disc rotation. That is, in the case where the light beam scans a track in ZONE 34, it is detected that the disc has made one rotation when the count value of the edge counter 23 shows 59.

Figure 10:
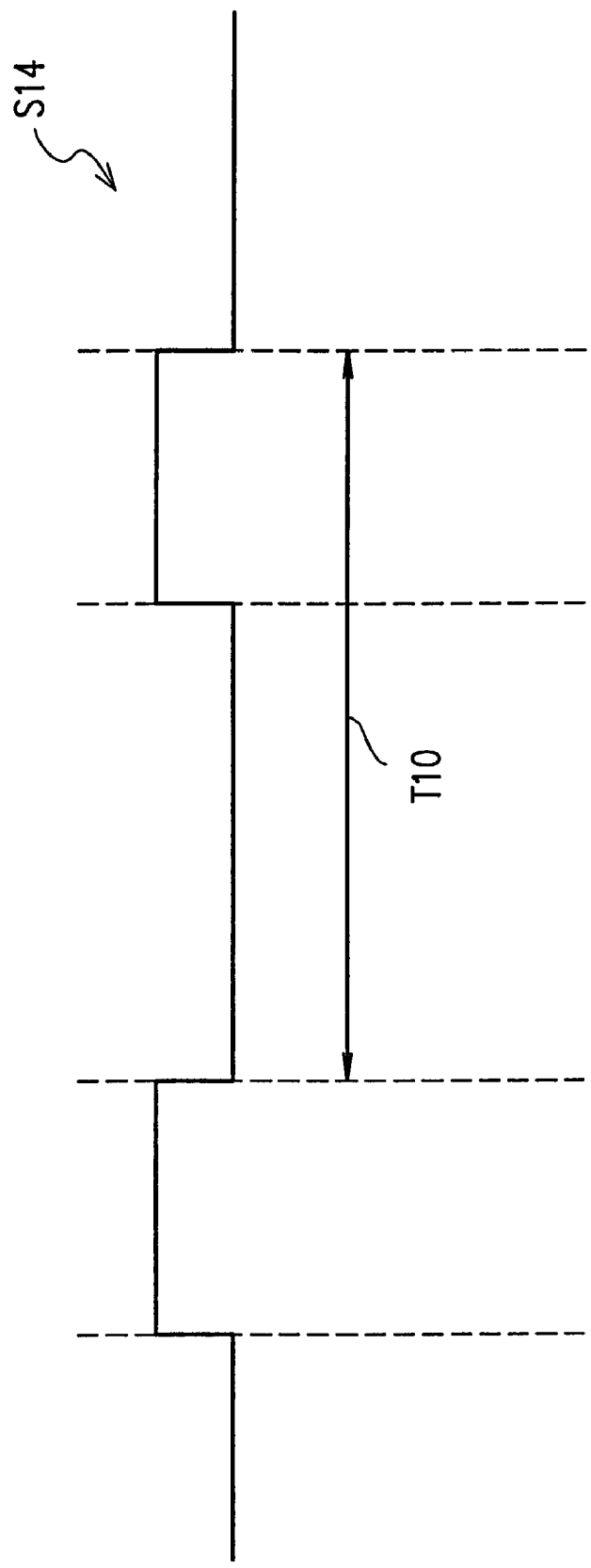
FIG. 10 illustrates an operation of a period counter 24 of FIG. 1.

Next, operation of the period counter 24 is described using FIG. 10. The signal waveform shown in FIG. 10 illustrates the ID gate signal S14 output from the ID gate generation circuit 22. The period counter 24 uses a special clock to count a time period indicated by "T10" in FIG. 10, i.e., a time period from a rising edge of the ID gate signal S14 to a next falling edge of the ID gate signal S14 in a next sector. That is, the period counter 24 counts a time period which is spent by the light beam to pass through one sector. By using an output from the period counter 24, a deviation rate of the rotation velocity of the optical disc 1 from the reference rotation velocity, which is used for recording or reproduction, can be obtained in the DSP 14. Now, consider a case where the disc rotation velocity is faster than a standard velocity by 5% when the period counter 24 operates by units of 0.014 ms. In the case where a DVD-RAM disc having a capacity of 4.7 Gbytes rotates at the standard rotation velocity, which is used as a reference for recording or reproduction, about 0.7 ms is spent for the light beam to pass through one sector. Thus, the period counter 24 counts 0.7/0.014=50. In the case where the output of the period counter 24 is 47.5, a value 47.5/50=0.95 is obtained. That is, it can be detected that the disc rotation velocity is faster than the standard rotation velocity by 5%.

Next, operation of the servo controller 25 for detecting servo abnormality is described. When the light beam is scanning a fingerprint adhered on the optical disc 1, it is possible that the tracking error signal TE varies. In the case where tracking control follows this variation in the tracking error signal TE, some problems may occur, for example, tracking control goes out of order, tracking control is performed on a track adjacent to an intended track, or the like. The servo controller 25 monitors the level of the tracking error signal TE, and outputs to the microcomputer 15 a servo abnormality detection signal S9 which becomes high (H) when it is detected that the tracking error signal TE is varied so as to be equal to or higher than a specific level.

Figure 11:
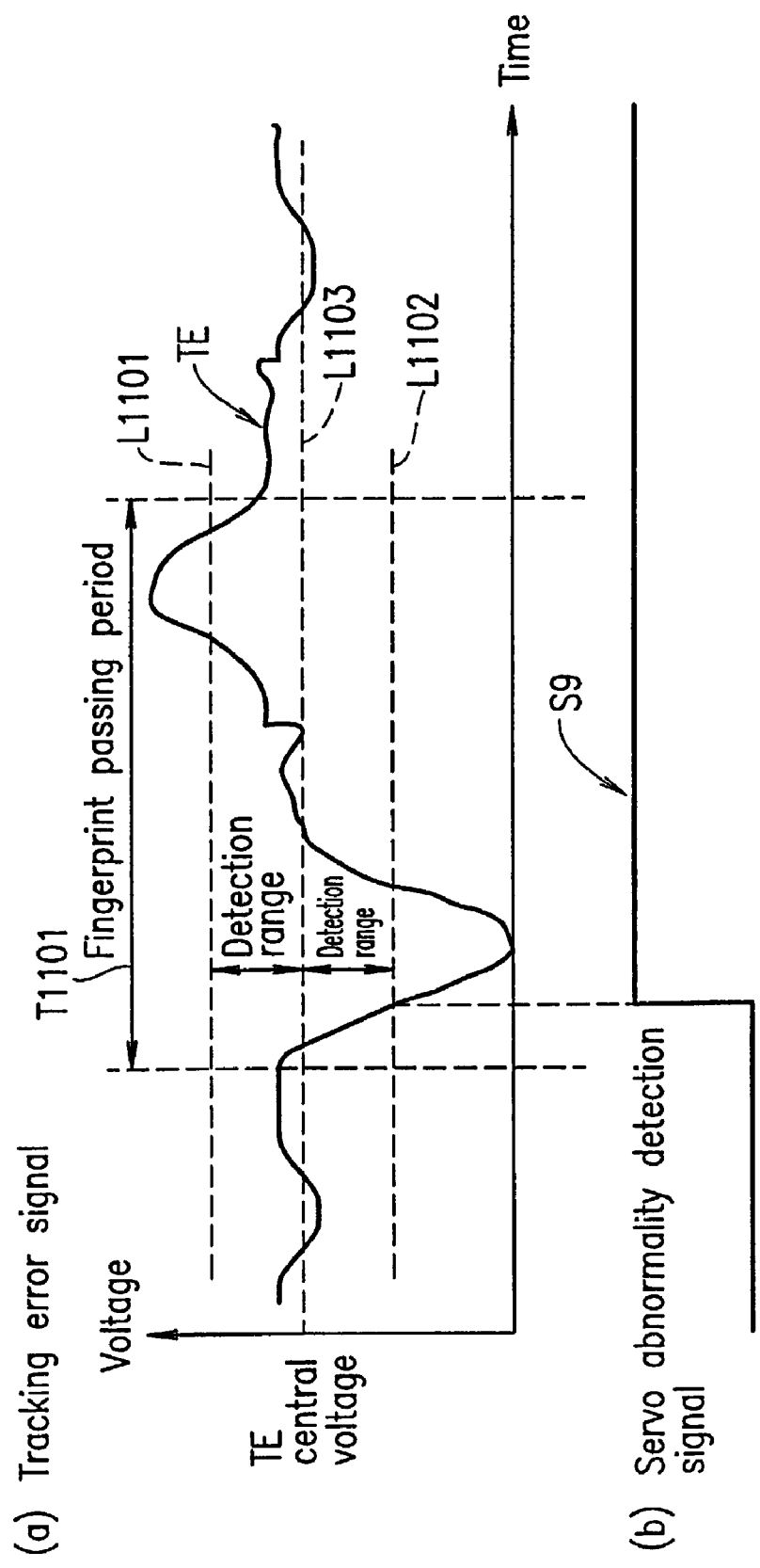
FIGS. 11(a) and 11(b) illustrate a servo abnormality detection signal output by a servo controller 25 of FIG. 1.

Now, refer to FIGS. 11(a) and 11(b). FIG. 11(a) shows the waveform of the tracking error signal TE, where the horizontal axis represents time, and the vertical axis represents voltage. The broken lines shown in the drawing indicate synchronism between FIGS. 11(a) and 11(b). A voltage level labeled with "TE central voltage" on the vertical axis is a central voltage L1103 of the tracking error signal TE. The tracking error signal TE is controlled so as to be kept in the vicinity of this voltage level when tracking control is normally performed. Specific voltage levels are provided at positions uniformly distant in both positive and negative voltage direction from the TE central voltage L1103. When the tracking error signal TE exceeds these voltage levels, it is detected that tracking control is in an abnormal state. In FIG. 11(a), abnormality detection levels L1101 and L1102 are shown by broken lines which are distant from the central voltage L1103 by a distance labeled with "detection range". The waveform of the tracking error signal TE shown in FIG. 11(a) is an exemplary waveform which is obtained when the light beam is passing over a fingerprint. During a period T1101 which is indicated by an arrow labeled with "fingerprint passing period", the waveform of the tracking error signal TE in FIG. 11(a) largely varies. FIG. 11(b) shows a servo abnormality detection signal S9 output by the servo controller 25 when the tracking error signal TE is input to the servo controller 25. The servo abnormality detection signal S9 is a binary signal, which is high (H) when the tracking error signal TE exceeds the abnormality detection levels L1101 and/or L1102, and is low (L) otherwise.

Next, operation of the track information generation section 17 is described. In the case where a fingerprint is adhered on the optical disc 1, the power of the light beam, which is output from a laser and which reaches an information recording plane for recording data, is not an intended power, and accordingly, the data may not be normally recorded. In order to avoid this problem, according to the present invention, there are provided functions of examining whether or not a fingerprint is adhered on the optical disc 1 after the optical disc 1 is placed in a recording/reproduction apparatus and before user data is recorded or reproduced, and warning, in advance, a user who attempts to record data on the optical disc 1.

However, examination of all tracks with respect to whether or not a fingerprint is adhered on the optical disc 1 consumes considerable time. Thus, according to the present invention, after the optical disc 1 is installed in the apparatus, a plurality of tracks selected from positions on the disc 1 which are uniformly separated along a radial direction are examined so as to determine within a short period of time whether a fingerprint is adhered on the optical disc 1, whereby the position of the fingerprint on the optical disc 1 is estimated. The track information generation section 17 informs the microcomputer 15 which track is to be examined with respect to whether or not a fingerprint is adhered on the optical disc 1, according to the type of the optical disc 1. Now, this operation is described using the table data of FIG. 12, considering a case where a DVD-RAM disc having a capacity of 4.7 Gbytes is examined. As described above, a DVD-RAM disc is divided into 35 zones along a radial direction. Each zone includes uniformly arranged 1568 tracks. The length of one zone along the radial direction is the same among all of the zones. Considering a normal thickness of a finger of a human, it is appreciated that almost every fingerprint has a size equal to or larger than that of one zone.

Figures 12, 13:
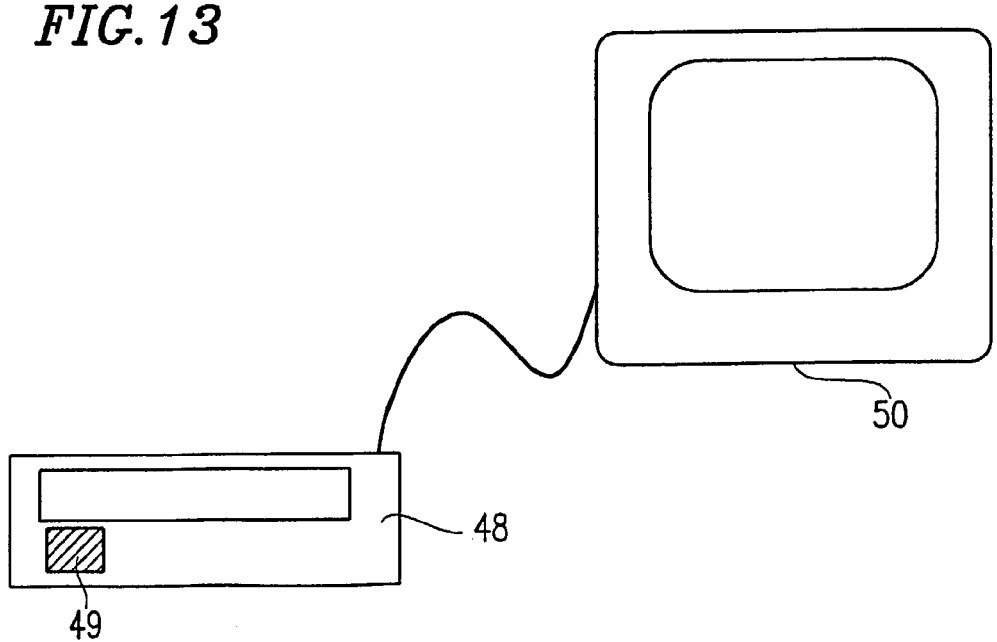
FIG. 12 shows table data which illustrates an operation of a track information generation section 17 of FIG. 1.
FIG. 13 shows a structure of a display section 16 of FIG. 1.

Thus, examining one or two tracks for each zone can produce substantially the same effect as that obtained by examining the entire surface of the optical disc 1 with respect to whether or not a fingerprint is adhered. FIG. 12 is a table where addresses in an examined track for each zone are listed. Two addresses are shown in each zone. The track information generation section 17 contains information corresponding to this table as table data. In response to an access from the microcomputer 15, the track information generation section 17 outputs address 32000h of Zone 0 as information. The microcomputer 15 moves the pickup 4 to the input address, and determines whether or not a fingerprint is detected from a track in which the designated address is present. After the track has been examined, the microcomputer 15 accesses the track information generation section 17 again. Then, the track information generation section 17 outputs a next address of Zone 0, i.e., address 39000h, as information. Thereafter, this operation is repeatedly performed for all zones. After examination on a track of the outermost zone, Zone 34, which includes address 260000h, has been completed, the track information generation section 17 sends to the microcomputer 15 information that there is no track remaining. After this information is input to the microcomputer 15, the microcomputer 15 edits information about a fingerprint(s) obtained from all the examined tracks according to a method which will be described later, and outputs the edited information to the display section 16.

Next, a structure of the display section 16 is described using FIG. 13. An LED 49 is connected to an entire panel surface of an optical disc apparatus 48 which includes all the components shown in FIG. 1 except for the display section 16. The LED 49 is flashed at a certain interval when the microcomputer 15 finds dirt. Further, the optical disc apparatus 48 is connected to a monitor 50 which has a display screen. A fingerprint adhered on the optical disc 1 which is detected by the microcomputer 15 is displayed on a screen of the monitor 50 based on a certain display method. The display method and displayed contents of the display section 16 will be described later.

Figure 14:
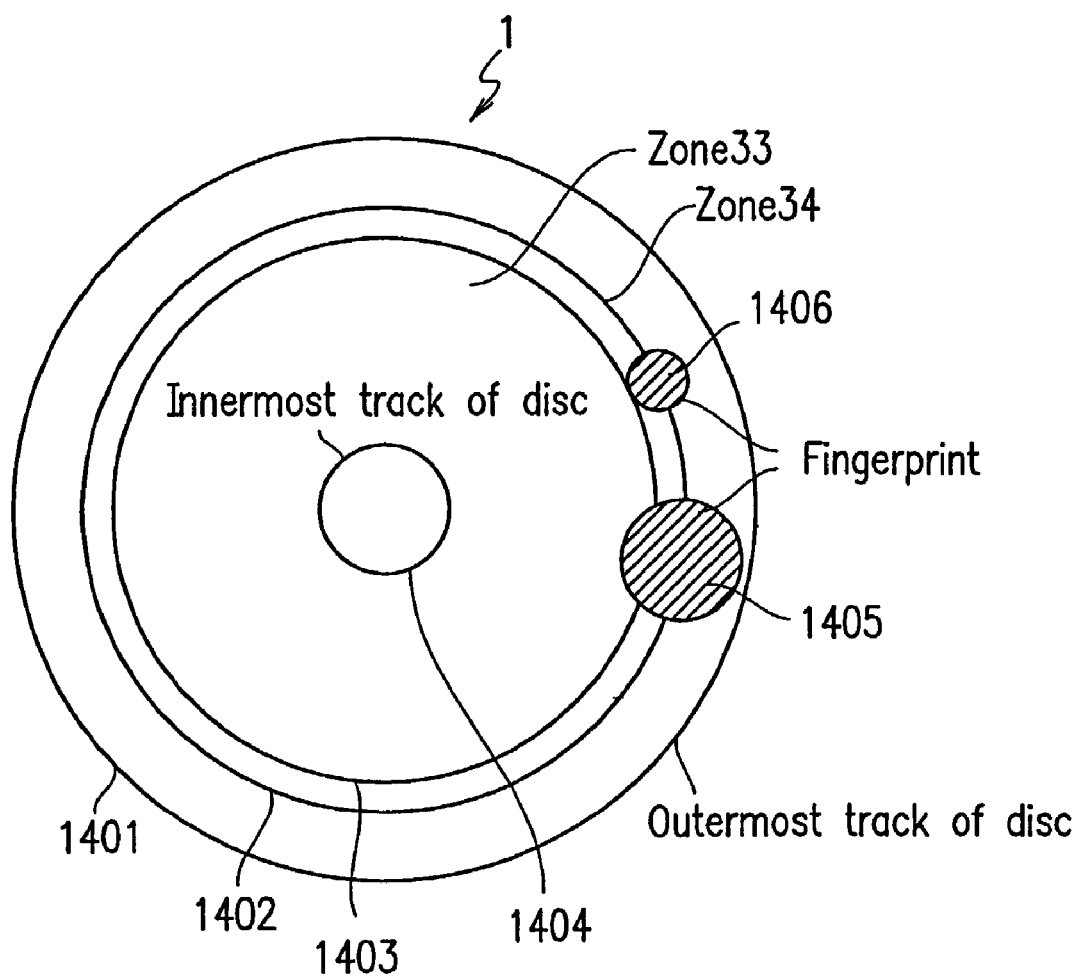
FIG. 14 is a schematic view showing fingerprints adhered on an optical disc 1.

Next, a function achieved by operation of the components shown in FIG. 1 is described. First, in order to avoid complexity of description, a specific example where a fingerprint is adhered on the optical disc 1 is described below. FIG. 14 shows examples of fingerprints adhered on the optical disc 1. FIG. 14 shows four circles concentrically arranged with the outermost circle representing an outermost track 1401 of the optical disc 1. The second outer circle represents a track 1402 which is present within Zone 34, and the third outer circle represents a track 1403 which is present within Zone 33. The innermost circle represents the innermost track 1404 of the optical disc 1. Circles which extend over Zone 33 and Zone 34 represent a fingerprint 1405 and a fingerprint 1406. Herein, assume that two fingerprints, a small-sized fingerprint 1406 which extends only within Zone 34 and a medium-sized fingerprint 1405 which extends over Zone 33 and Zone 34, are adhered on the optical disc 1.

First, an operation of detecting detailed information about the fingerprints 1405 and 1406, adhered in one track, by the DSP 14 is described. Then, an algorithm, based on which the microcomputer 15 examines all the zones of the optical disc 1 according to the track information of the track information generation section 17 (FIG. 1) and collects information about the fingerprints, is described. Thereafter, a method for displaying the information about the fingerprints on the display section 16 according to the information collected by the microcomputer 15 and a content to be displayed will be described, and then, an operation of recording data in a track of a zone in which a fingerprint is detected will be described. In the last, it is considered that the optical disc 1 is a disc different from a DVD-RAM disc, wherein information about a fingerprint detected according to the method of the present invention is recorded in a recording region other than a user data recording region. A method for recording the information of the detected fingerprint in such a disc, wherein the recorded information is referred to by the microcomputer 15 in a user data recording operation, will be described.

Figure 15:
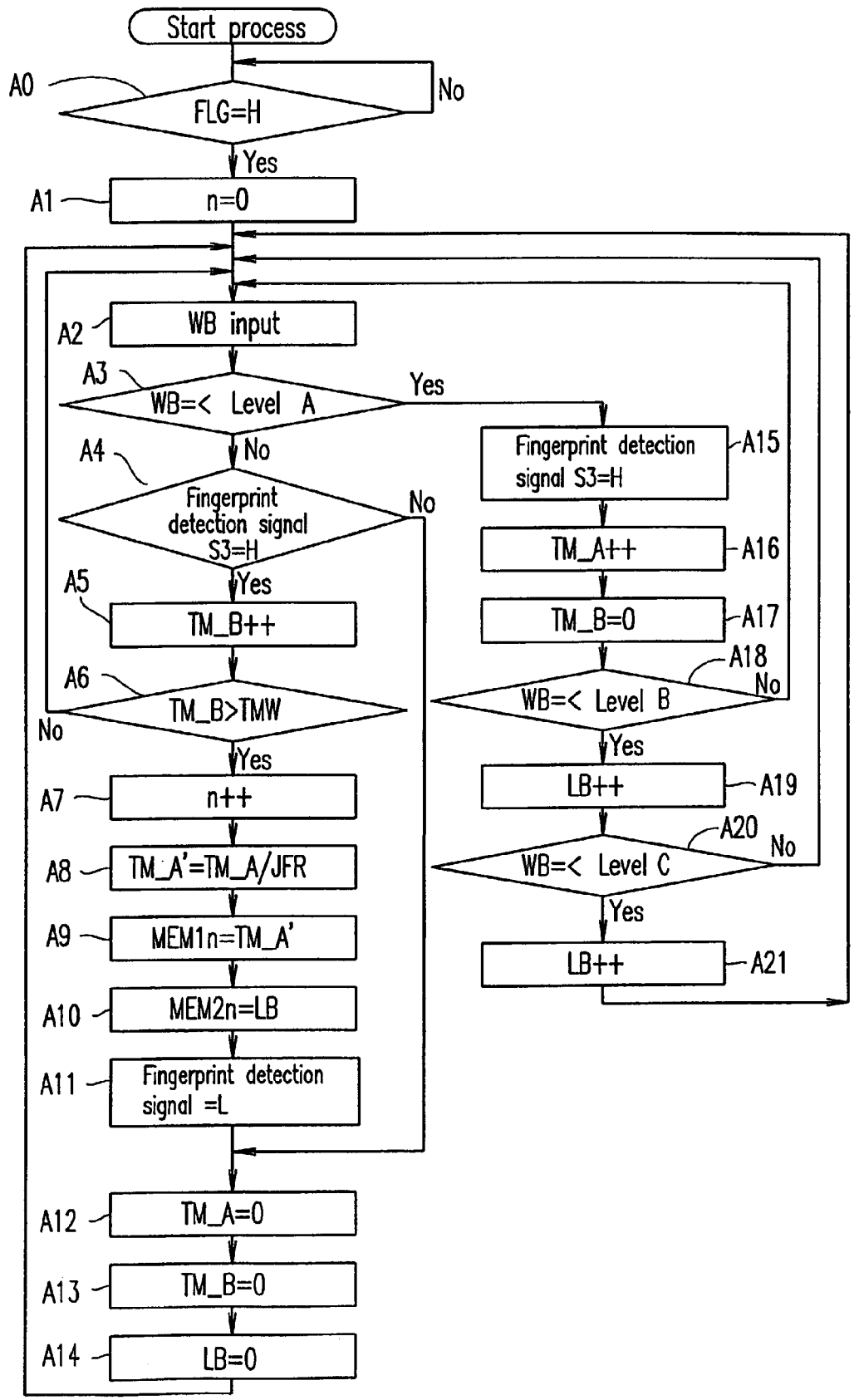
FIG. 15 is a flowchart which illustrates a fingerprint detection operation by a DSP 14 of FIG. 1.
Figure 16:
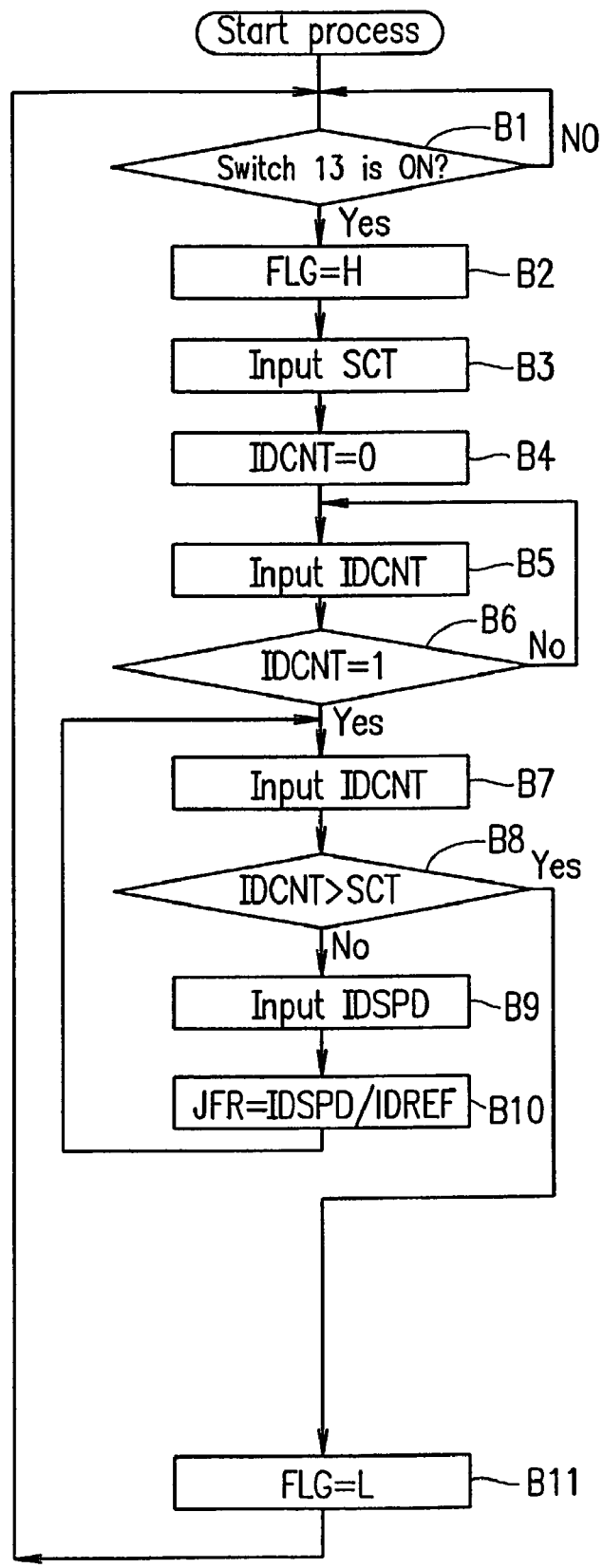
FIG. 16 is a flowchart which illustrates a time measurement operation for one track in a DSP 14 of FIG. 1.
Figure 17:
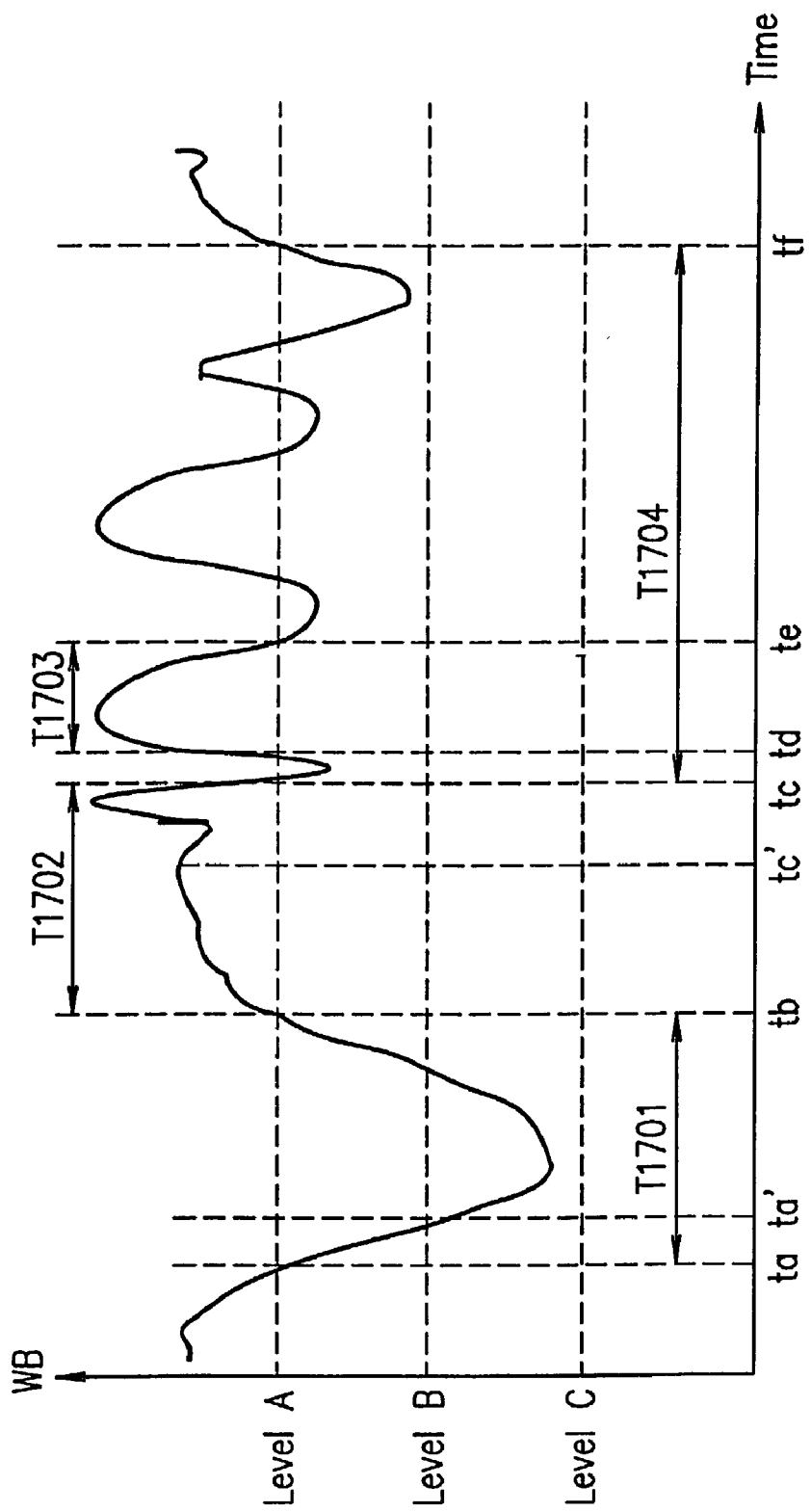
FIG. 17 illustrates a waveform of an output signal of a variation rate detection circuit 12 of FIG. 1.

First, operation of the DSP 14 which is performed when the microcomputer 15 instructs examination of a track including address 250000h (FIG. 12) of Zone 34 is described using flowcharts of FIGS. 15 and 16 and FIG. 17. FIG. 15 is a flowchart which illustrates an operation of detecting a variation in the wobble amplitude in one track. FIG. 16 is a flowchart which illustrates an algorithm for controlling the operation illustrated in FIG. 15. Before the processes of FIGS. 15 and 16 are started, the spindle motor 2 rotates the optical disc 1 at a rotation velocity which is higher than a standard rotation velocity used for recording or reproduction by 5%; and the servo controller 25 performs focusing control such that the light beam is focused on an information recording plane of the optical disc 1, and performs tracking control such that the light beam follows a track of the optical disc 1. Furthermore, assume that the light beam is present in a track including address 250000h within Zone 34, and the microcomputer 15 keeps the switch 13 off.

The processes shown in FIGS. 15 and 16 are endless loops, and a single round of each loop requires 0.014 ms. In FIG. 16, process step B1 is performed by the microcomputer 15 for confirming an on/off operation of the switch 13. In the case where the switch 13 is off, the process is on standby until the switch 13 is turned on at process step B1. Process step A0 of FIG. 15 is processing of waiting for the flag FLG output within the process of FIG. 16 being raised to high (H). Currently, the flag FLG is L because the process of FIG. 16 is at process step B1. Thus, the process of FIG. 15 is also on standby. When the microcomputer 15 determines, based on the address S8 output from the signal generation circuit 21, that the light beam reaches a sector at address 250000h, the switch 13 is turned on. When the switch 13 is turned on, the output of the variation rate detection circuit 12 is input to the DSP 14.

A fingerprint is not adhered on a sector in which address 250000h is present, and therefore, the variation rate detection circuit 12 outputs "1". When it is detected that the switch 13 is turned on at process step B1, the process proceeds to process step B2. At process step B2, immediately after the switch 13 is turned on, the flag FLG is turned to high (H) which indicates that a fingerprint detection operation for one track is currently being performed. The flag FLG is also output to the microcomputer 15. Then, the process proceeds to process step B3. At process step B3, the number of sectors, SCT, is input from the microcomputer 15. In a track including address 250000h, the number of sectors is 59, i.e., SCT=59. Subsequently, at process step B4, a counter value IDCNT, in which the output of the edge counter 23 is stored, is cleared to 0. Subsequently, at process step B5, the counter value IDCNT of the edge counter 23 is input. Currently, the counter value IDCNT is 0 because the light beam is present in a sector at address 250000h. Subsequently, at process step B6, it is determined whether of not the counter value IDCNT is 1, and the process is branched. If the counter value IDCNT is 0, the process returns to process step B5. The loop of process step B5 and process step B6 is repeated until the light beam reaches a next sector.

Now, consider that the light beam reaches a sector at address 250001h. The edge counter 23 detects a rising edge of the ID gate signal, and the counter is incremented so that the counter value IDCNT is 1. Currently, at process step B6, it is determined that the counter value IDCNT is 1, and the process proceeds to process step B7. At process step B7, the counter value IDCNT is input again. Currently, the counter value IDCNT is 1. Subsequently, at process step B8, it is determined whether or not the counter value IDCNT exceeds the number of sectors, SCT, in a sector of a track in which the light beam of the recording/reproduction section is present. Currently, the counter value IDCNT does not exceeds the number of sectors, SCT. Thus, process proceeds to process step B9.

At process step B9, an output IDSPD of the period counter 24 is input. Currently, the optical disc 1 is rotating at a rotation velocity which is faster than a reference rotation velocity, which is used for recording or reproduction on the optical disc 1, by 5%. Thus, as described above, the output IDSPD is 47.5. Subsequently, at process step B10, the value IDSPD is divided by a target value IDREF of the period counter 24 which is obtained when the optical disc 1 is rotating at a reference rotation velocity used for recording or reproduction, i.e., IDREF=50, whereby a variation rate JFR of the current rotation velocity with respect to the standard rotation velocity is calculated. Currently, JFR=47.5/50=0.95. After process step B10, the process returns to process step B7. The above processing is repeated until it is determined at process step B8 that IDCNT>SCT.

Next, refer to the flowchart of FIG. 15. At process step A0, it is determined that the flag FLG is H (FLG=H). The process proceeds to process step A1. At process step A1, a dirt substance number counter n, which will be described later, is cleared to 0. Then, the process proceeds to process step A2. At process step A2, an output WB of the variation rate detection circuit 12 is input through the switch 13. Currently, the light beam is scanning a sector on which a fingerprint is not adhered, and therefore, the output WB=1. Subsequently, at process step A3, it is determined whether or not the output WB is equal to or smaller than a value of level A. Herein, level A represents a 20% reduction in the wobble amplitude which is caused due to a fingerprint, and level A=0.8. Similarly, level B represents a 30% reduction in the wobble amplitude, and level B=0.7. Level C represents a 40% reduction in the wobble amplitude, and level C=0.6. Since the output WB (=1) is greater than level A (=0.8), i.e., the output WB=1>level A=0.8, the process proceeds to process step A4.

At process step A4, it is determined whether or not a fingerprint detection signal S3, which indicates that fingerprint detection was performed and which is output to the LPF control section 11, is high (H). Currently, a fingerprint is not detected, and the fingerprint detection signal S3 is low (S3=L). At this point, the process proceeds to process step A12. At process step A12, a counter TM_A (described later) is cleared to 0. Subsequently, at process step A13 also, a counter TM_B (described later) is cleared to 0. Subsequently, at process step A14, a counter LB (described later) is cleared to 0. Then, the process returns to process step A2. The above processes are repeated until a fingerprint is detected. During the repetition of the above processes, the counters TM_A, TM_B, and LB are kept to be 0.

How a fingerprint is detected while the light beam is scanning a track in which address 250000h is present is now described. FIG. 17 shows an output waveform of the variation rate detection circuit 12 which is output when the light beam is scanning a track which is currently examined. In FIG. 17, the horizontal axis represents time, and the vertical axis represents the level of the output WB. In the drawing, level A, level B, and level C, shown along the vertical axis, correspond to the above described levels. The period T1701 between time ta and time tb represents a period in which the light beam passes over the small-sized fingerprint 1406 shown in FIG. 14, which exceeds level B and which extends only within Zone 34. The period T1704 between time tc and time tf represents a period in which the light beam passes over the middle-sized fingerprint 1405 shown in FIG. 14, which exceeds level A but does not exceed level B and which extends over Zone 34 and Zone 33. The output WB may locally vary according to the state of the adhered fingerprint during the period T1704, and the output WB may not exceed level A as shown in the period T1703 between time td to time te. Herein, the period T1702 between time tb to time tc represents a period when the light beam moves between the two fingerprints.

The process of FIG. 15 is described while considering a case where the output WB having a waveform shown in FIG. 17 is input. At time ta, the value of the output WB input at process step A2 is 0.8. Subsequently, at process step A3, the output WB is equal to or lower than level A, and thus, the process proceeds to process step A15. At process step A15, the fingerprint detection signal S3 at a high (H) level is output to the LPF control section 11. The LPF control section 11 switches the band of an incorporated low pass filter to a low band of 25 Hz when the fingerprint detection signal S3 is at a high (H) level. Thus, an influence of a variation in the wobble amplitude in the period T1701 on a reference value, which is used for obtaining the output WB, is decreased. Subsequently, at process step A16, the counter TM_A, which is used for obtaining a period when fingerprint detection is performed, is incremented. Subsequently, at process step A17, the counter TM_B, which is used for counting a period when the output WB is equal to or higher than level A after a fingerprint is detected, is cleared to 0. Subsequently, at process step A18, it is determined whether or not the output WB is equal to or lower than level B. Since the output WB is currently 0.8, the process returns to process step A2. The output WB changes with the passage of time, and the output WB is 0.7 at time ta'. At this point in time, at process step A18, it is determined that the output WB is equal to or lower than level B. Then, the process proceeds to process step A19.

At process step A19, the counter LB, which indicates the adhesion strength of a fingerprint onto the optical disc 1, is incremented. Subsequently, at process step A20, it is determined whether or not the output WB is equal to or lower than level C. Since the output WB has a value greater than level C, the process returns to process step A2. During the period T1701, the output WB is not equal to or lower than level C, and therefore, the condition at process step A20 is not satisfied. When the condition at process step A20 is satisfied, the process proceeds to process step A21. At process step A21, the value of the counter LB is further incremented. The process returns to process step A2 again. That is, when the output WB is equal to or lower than level A and higher than level B, the counter LB is 0. When the output WB is equal to or lower than level B and higher than level C, the counter LB is 1. When the output WB is equal to or lower than level C, the counter LB is 2. During the period T1701, the counter LB is 1.

Next, operation performed after time tb is described. At this time, the output WB is higher than level A. Thus, the process proceeds from process step A3 to process step A4. At process step A4, the fingerprint detection signal S3 is at a high (H) level. Therefore, the process proceeds to process step A5. At process step A5, the counter TM_B is incremented. At process step A6, it is determined whether or not the value of the counter TM_B is greater than a reference value TMW. The reference value TMW is used for determining whether or not the light beam is passing through a region other than a fingerprint region after the light beam has passed over a fingerprint. As described above, the counter TM_B is a counter which is incremented by units of 0.014 ms. In the case where the optical disc 1 rotates at the reference rotation velocity which is used for recording or reproduction on the optical disc 1, the moving velocity of the light beam is 8.5 m/s. Now, assume that the time period, which elapses after the level of the output WB exceeds level A, becomes equivalent to a distance of about 3 mm after the fingerprint has been passed, it is determined that the light beam has passed through a region other than a fingerprint region. In such a case, 0.003/8.5=0.000352, and accordingly, 0.352/0.014=25.14. Thus, the reference value TMW is 25. At a point immediately after time tb, the counter TM_B is 1, and therefore, the process returns to process step A2.

Now, assume that the counter TM_B becomes 26 after time tc' has passed. At this time, it is determined that a detection operation for a single fingerprint has ended, and the process proceeds from process step A6 to process step A7. At process step A7, the dirt substance number counter n, which counts the number of fingerprints detected in one track, is incremented. Currently, the counter n is 1. Then, the process proceeds to process step A8. At process step A8, the value of the counter TM_A is divided by the value of the variation rate JFR, and is corrected so as to be a detection value for a case where the optical disc 1 is rotating at a reference rotation velocity for recording or reproduction on the optical disc 1. This corrected value is used as a counter TM_A'. Consider that the value of the counter TM_A measured during the period T1701 is 40. In this case, the variation rate JFR is 0.95, and therefore, the counter TM_A'=40/0.95=42.

Subsequently, at process step A9, the value of the counter TM_A' is stored for each fingerprint in a memory MEM1n incorporated in the DSP 14. Currently, the dirt substance number counter n is 1, and the counter TM_A' is 42. Therefore, the value of 42 is stored in the memory MEM11. Subsequently, at process step A10, the value of the counter LB is stored for each fingerprint in a memory MEM2n in a similar manner to that of process step A9. Currently, the dirt substance number counter n is 1, and the counter LB is 1. Therefore, the value of 1 is stored in the memory MEM21. Subsequently, at process step A11, a fingerprint is not currently detected, and therefore, the fingerprint detection signal S3 at a low (L) level is output. The processes performed at and after process step A12 are the same as the above described processes which are performed when no fingerprint is adhered, and descriptions thereof are therefore omitted.

Next, at time tc, the output WB again becomes equal to or lower than level A, the counter TM_A is counted in the same manner as that described above. At this time, the counter LB is 0. Assume now that a certain time period further elapses, and time td is reached. Consider that, at this time, the counter TM_A is 20. Subsequently, at process step A5, the counter TM_A is counted in the same manner as that described above. However, during period T1703, the light beam is passing over a fingerprint, and the output WB locally varies according to the state of the adhered fingerprint. Consider that time te is reached while the counter TM_B is 10, which is lower than the reference value TMW, and at time te, the output WB again becomes equal to or lower than level A. At this time, the process again proceeds from process step A3 to process step A15. Then, at process step A16, the counter TM_A is continuously counted. Then, at process step A17, the counter TM_B is cleared to 0. Thereafter, through the same processing as that described above, the counter TM_A is continuously counted until the output WB becomes larger than level A.

Assume that, at and after time tf, no fingerprint is detected, and it is determined at process step A6 that the counter TM_B is greater than the reference value TMW (TM_B>TMW). At this time, at process step A7, the counter n is incremented so that n=2. Consider that, at this time, the counter TM_A' is 100, and the counter LB is 0. In this case, as described above, the memory MEM12=100 is stored at process step A9, and the memory MEM22=0 is stored at process step A10. Subsequent processing is the same as that described above, and descriptions thereof are therefore omitted. The process illustrated in FIG. 15 is reset to process step A0 when the flag FLG becomes low (FLG=L) in the process of FIG. 16.

Thus, by performing the process illustrated in FIG. 15, the number of fingerprints adhered on the surface of the optical disc 1, the size of each fingerprint along the track direction, and the adhesion strength of each fingerprint, can be accurately determined without misrecognizing a local variation in the output WB as another fingerprint. Now, consider that during the above-described fingerprint detection operation, the light beam passes through some sectors, and IDCNT=60 is input at process step B7 of FIG. 16. At this time, a sector currently scanned by the light beam is distant by one or more tracks from a point at which the examination is started, i.e., a currently-scanned sector is a sector which is not to be examined. Subsequently, at process step B8, it is determined that IDCNT=60 is greater than SCT=59 (IDCNT=60>SCT=59), and then, the process proceeds to process step B11. At process step B11, the flag FLG=L is output, whereby the process of FIG. 15 is reset to process step A0, and the microcomputer 15 is informed that the examination for one track has been completed. In subsequent processing, the microcomputer 15 detects that the flag FLG is low (L), and turns off the switch 13. Then, the process proceeds to process step B1, and is maintained to be on standby until the microcomputer 15 turns on the switch 13 again.

As described above, the process illustrated in FIG. 16 is performed, wherein movement of the light beam for one track is detected by counting rising edges of the ID gate signal S14 output by the ID gate generation circuit 22. With such an operation, examination can be performed within one track time period with a very small error. Thus, there can be provided an effect of reducing an erroneous measurement of, for example, a redundant counting of one fingerprint.

Figure 18:
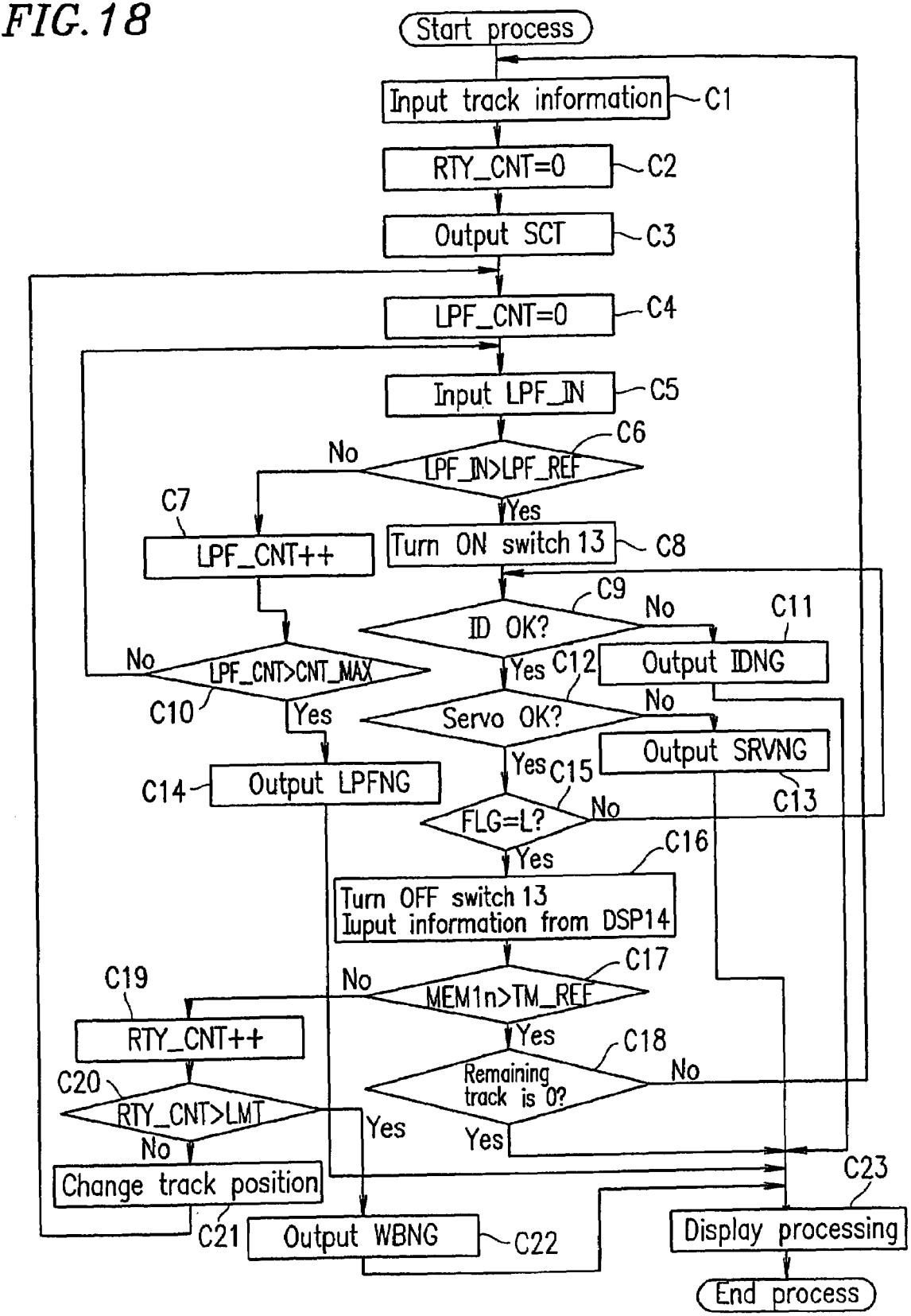
FIG. 18 is a flowchart which illustrates an operation of a microcomputer 15 of FIG. 1.

Next, an algorithm, based on which the microcomputer 15 performs examination of an entire zone of an optical disc according to track information obtained from the track information generation section 17, is described using FIG. 18. First, before the process of FIG. 18 is started, the spindle motor 2 rotates the optical disc 1 at a rotation velocity which is higher than a standard rotation velocity used for recording or reproduction, by 5%; and the servo controller 25 performs focusing control such that the light beam is focused on an information recording plane of the optical disc 1, and performs tracking control such that the light beam follows a track of the optical disc 1.

At process step C1, information about a track to be examined first is input from the track information generation section 17 to the microcomputer 15. As described above, the first track is present in the innermost zone, Zone 0, and address 32000h of a sector in Zone 0 is input to the microcomputer 15 (FIG. 12). Based on the input information, the microcomputer 15 issues to the servo controller 25 an instruction to move the pickup 4. The servo controller 25 drives the traverse motor 3 to move the pickup 4 to a track where address 32000h is present. That is, at process step C1, a process of moving the light beam to a position of a predetermined track to be examined is performed.

Subsequently, at process step C2, a counter RTY_CNT (described later) is cleared to 0. Then, at process step C3, the number of sectors included in a track to be examined, SCT, is output to the DSP 14. Since the number of sectors included in Zone 0 is 25, the sector number SCT=25 is output. Then, at process step C4, a counter LPF_CNT (described later) is cleared to 0. At process step C5, an output LPF_IN of the LPF control section 11 is directly input. Subsequently, at process step C6, the value of the output LPF_IN is compared with a value LPF_REF which is provided as a reference for the output of the LPF control section 11. As described above, the output of the LPF control section 11 is used as a reference value for detection of a fingerprint adhered on the optical disc 1, but the band of the low pass filter provided in the LPF control section 11 is as low as about 100 Hz. Thus, the output of the LPF control section 11 is not stable immediately after the pickup 4 is moved to a track to be examined. Under this condition, the fingerprint detection operation cannot be started.

The fingerprint detection operation is started after it is confirmed that the output of the LPF control section 11 is stabilized. A value used for confirming that the output is stabilized is the reference LPF_REF. As described above, consider that the level of the wobble amplitude signal S1, which is output from the wobble amplitude detection circuit 8 when a fingerprint is not adhered on the optical disc 1, is in the vicinity of 1 V. In consideration of an influence of an in-plane variation, the reference for the LPF output is set to a 30% reduced value, i.e., a value corresponding to 700 mV. Since the A/D converter 9 digitally converts a voltage of 0 V to 3 V at a resolution of 8 bit, the value corresponding to 700 mV is 59. Thus, in the case where the output LPF_IN is equal to or smaller than the reference LPF_REF=59, the process proceeds to process step C7. At process step C7, the counter LPF_CNT, which counts a latency time taken until the output of the LPF control section 11 is stabilized, is incremented.

Subsequently, at process step C10, it is determined whether or not the counter LPF_CNT exceeds a predetermined value CNT_MAX. If the counter LPF_CNT is equal to or smaller than the predetermined value CNT_MAX, the process again proceeds to process step C5. The looped processing from process step C5 to process step C10 is performed by units of 1 ms. Thus, the counter LPF_CNT is incremented every 1 ms. The predetermined value CNT_MAX is a maximum value of the time period in which the output of the LPF control section 11 can be sufficiently stabilized, and is set to about 5 ms. Accordingly, the value CNT_MAX is 5. In general, the output LPF_IN exceeds the reference LPF_REF before the counter LPF_CNT exceeds the value CNT_MAX.

However, in the case where the wobble amplitude is not normally input from the optical disc 1 due to some abnormality, and a fingerprint cannot be detected, it is necessary to provide a warning of such an abnormality. If it is determined at process step C10 that the counter LPF_CNT exceeds the value CNT_MAX, a flag LPFNG which provides a warning of a stabilization abnormality in the output of the LPF control section 11, is output. Thereafter, the process of process step C23 is performed to operate the display section 16 (described later), and the process of FIG. 18 is ended. Since the output LPF_IN generally exceeds the reference LPF_REF when the counter LPF_CNT is about 1 to 2, the process proceeds from process step C6 to process step C8. At process step C8, the switch 13 is turned on. In response to turning the on of the switch 13, the processes illustrated in FIGS. 15 and 16 begin, whereby a fingerprint detection operation begins for one track in which a sector of address 32000h is present.

Subsequently, at process step C9, an address recorded in an address region which is reproduced by the signal reproduction circuit 21 is input to determine whether or not an address of each sector in a track to be examined is correctly reproduced. At process step C9, in the case where it is determined that there is an abnormality in an address (i.e., information in an address region cannot be recognized), there is a high probability that a fingerprint having a high adhesion strength is adhered on the address region, or that there is an abnormality in the optical disc 1. In such a case, a fingerprint detection operation cannot be normally performed. Then, the process proceeds to process step C11, and a flag IDNG, which warns about an abnormality that occurred in reproduction of an address, is output. Thereafter, the display section 16 (described later) is operated at process step C23, and then, the process of FIG. 18 is ended. However, in general, the address can be normally reproduced, and thus, the process proceeds from process step C9 to process step C12.

At process step C12, the servo abnormality detection signal S9 which is output by the servo controller 25 is input to determine whether servo control is normal or not. In the case where a fingerprint having a high adhesion strength is adhered on the disc as described above, the tracking error signal TE varies. There is a possibility that some abnormality occurs, for example, tracking control goes out of order, or tracking control is performed on a track which is not to be examined. In this case, the fingerprint detection operation cannot be normally performed. In the case where it is determined at process step C12 that there is a servo abnormality, the process proceeds to process step C13. At process step C13, a flag SRVNG which warns about the servo abnormality is output. Thereafter, the display section 16 (described later) is operated at process step C23, and then, the process of FIG. 18 is ended.

In general, the servo operates normally, and the process proceeds from process step C12 to process step C15. At process step C15, the DSP 14 is operated to input the flag FLG so as to determine whether or not the examination for one track has been completed. In the case where the examination for one track has not yet been completed, the process returns to process step C9, and an abnormality monitoring operation of a system is continued. The looped processing from process step C9 to process step C15 is also performed by units of 1 ms. If it is determined at process step C15 that the flag FLG is low (FLG=L), the process proceeds to process step C16. At process step C16, the switch 13 is turned off, and fingerprint detection information about an examined track is extracted from a memory incorporated in the DSP 14. In particular, the value of the counter n and the values of the memory MEM1n and the memory MEM2n are stored in the memory incorporated in the microcomputer. Herein, consider that a fingerprint is not adhered on Zone 0, and n=1, MEM11=10, MEM21=0 are input, although it would be ideal that n=0, MEM1n=0, MEM2n=0.

Subsequently, processing of process step C17 is performed only when the memory MEM1n has a value different from 0. When MEM1n=0, the process proceeds to process step C18 without doing anything at process step C17. Currently, since the value of the memory MEM11 is 10, the value of the memory MEM1n is compared with a specific value TM_REF. It is assumed that the specific value TM_REF indicates a minimum value which can be regarded as a fingerprint, and is herein set to 20. In the case where the value of the memory MEM1n is equal to or smaller than the specific value TM_REF, it is highly possible that a variation in the wobble amplitude, which was caused due to an initial defect on an examined track other than a fingerprint, was detected. In this case, it is difficult to conclude that the wobble amplitude variation was caused due to a fingerprint. Currently, since the value of the memory MEM1, MEM11=10, is equal to or smaller than the specific value TM_REF, TM_REF=25, the process proceeds to process step C19. At process step C19, a counter RTY_CNT, which counts the number of times re-examination is performed in another track, is incremented. Herein, the value of the counter RTY_CNT is 1.

Subsequently, at process step C20, it is determined whether or not a value LMT, which limits the value of the counter RTY_CNT, i.e., the number of times there-examination is performed, is equal to or smaller than 3. In the case where the counter RTY_CNT exceeds the value LMT after the re-examination is performed several times, there is a possibility that a wobble is not normally formed at the time of production of the optical disc 1. In such a case, the fingerprint detection operation cannot be normally performed. In the case where the counter RTY_CNT exceeds the value LMT at process step C20,the process proceeds to process step C22. At process step C22, a flag WBNG, which warns about an abnormality in wobble information, is output. Then, the display section 16 (described later) is operated at process step C23, and thereafter, the process of FIG. 18 is ended.

In general, however, the wobble is normally formed, and therefore, the process proceeds from process step C20 to process step C21. At process step C21, an instruction is issued to the servo controller 25 to move the light beam from a current track to a track in the same zone which is distant from the current track by several tracks. For example, in the case where the instruction prescribes that the light beam is moved to a track which is distant by 10 tracks, the servo controller 25 drives the traverse motor 3 to move the pickup 4 to a track in which address 3200Ah is present. Subsequently, the process proceeds to process step C4, and the processing at and after process step C4 is performed again. At process step C16, fingerprint detection information about an examined track is extracted from a memory incorporated in the DSP 14. Assume that n=0, MEM1n=0, and MEM2n=0 are input at this time. Subsequently, at process step C17, the value of the memory MEM1n is 0, and thus, the process proceeds to process step C18. At process step C18, it is determined whether the just examined track is the last track and whether there is a remaining track. The currently examined track is the first track in Zone 0, but not the last track. In this case, the process returns to process step C1.

At process step C1, information about a next track to be examined is input from the track information generation section 17 to the microcomputer 15, and the pickup 4 is moved to a track position having a sector of address 39000h. Subsequent processing is the same as that described above, and descriptions thereof are therefore omitted. In the case where it is determined at process step C18 that there is no remaining track to be examined, the process proceeds to process step C23. At process step C23, in the case where n is not 0 in each zone, the LED 49 is flashed at an interval of 1 second, thereby warning that a fingerprint is adhered on the optical disc 1. Further, a predetermined condition (described later) is considered, and the state of a fingerprint adhered on the optical disc 1 is displayed on the monitor 50. After the display processing on the monitor 50 is performed at process step C23, the process of FIG. 18 is ended. Note that the time required for one rotation of the optical disc 1 is about 45 ms even for the outermost track. The time required for examination of all the zones is about 10 seconds or less, even when an access time for each zone is included in that time. Thus, it can be said that the latency time, which is caused due to the process of fingerprint detection before recording of user data, is not a serious burden to a user.

Figure 19:
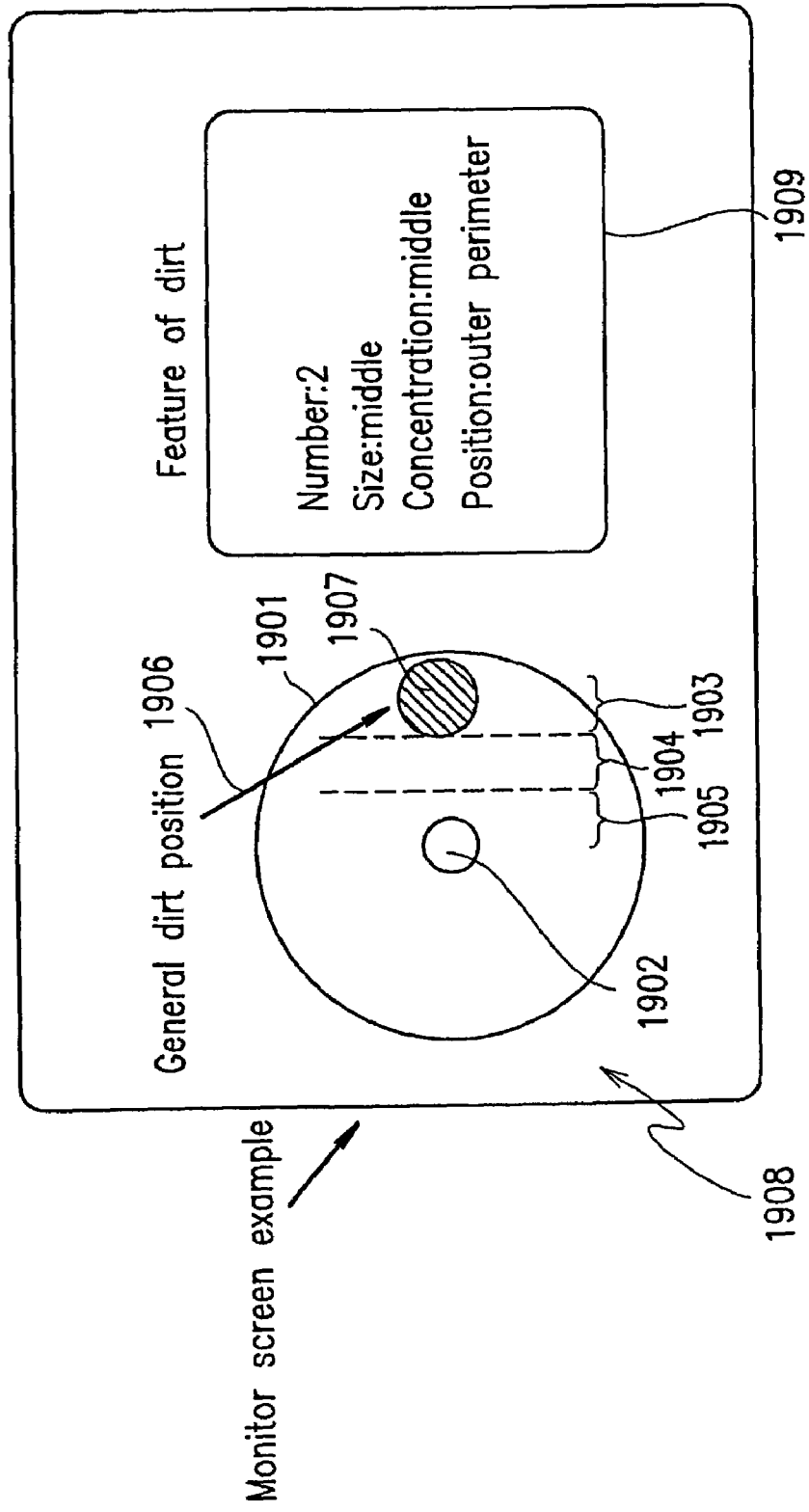
FIG. 19 illustrates a display shown on a screen of a monitor 50 of FIG. 13.

Next, a method for displaying information on the monitor 50 at process step C23 and contents to be displayed are described. FIG. 19 shows a display example. The inside of a rectangular frame indicated by "Monitor screen example" represents a monitor screen. At the left side of the monitor screen, concentric circles, a large circle 1901 and a small circle 1902, are shown. A diagram 1908, above which the title "General dirt position" is shown, schematically represents a disc. The disc 1908 is divided by a vertical broken line. A region 1903 closer to the outer circle 1901 is an outer perimeter region 1903 of the disc. A region 1904 is an intermediate region of the disc, and a region closer to the inner circle 1902 is an inner perimeter region 1905. In the example illustrated in FIG. 19, an encircled region 1907 in the outer perimeter region 1903, which is pointed to by an arrow 1906, schematically shows a model of a fingerprint.

That is, the diagram 1908 at the left side of the screen schematically shows a general position of a fingerprint adhered on the disc.

In a box region 1909 at the right side of the screen, above which the title "Feature of dirt" is shown, information about a fingerprint adhered on the optical disc 1 is shown by characters. In this exemplary diagram, information about a fingerprint(s) is shown: "Number" which represents the number of fingerprints; "Size" which represents the size of a fingerprint along the track direction; "Concentration" which represents the adhesion strength of a fingerprint; and "Position" which represents the position of an adhered fingerprint.

How the above contents to be displayed are obtained is described. The information about dirt detected through the processes illustrated using FIGS. 15 through 18 can be edited as described below. Now, consider that in Zone 0 through Zone 32, n=0, MEM1n=0, and MEM2n=0, where as in Zone 33, n=1, MEM1n=100, and MEM2n=0. Further, in Zone 34, n=2, MEM11=42, MEM21=1 ,MEM12=100, and MEM22=0. Furthermore, any of the flag LPFNG, the flag IDNG, the flag SRVNG, and the flag WBNG is not output. The information edited herein includes "the number of fingerprints", "the size of a fingerprint along the track direction", "the adhesion strength of a fingerprint", "the position of an adhered fingerprint" and "an abnormality other than a fingerprint".

The "number of fingerprints" represents the number of fingerprints in all the zones, i.e., the maximum number of the counter n. Under the above conditions, n=2. The "size of a fingerprint along the track direction" is "small" when the maximum value of the memory MEM1n for all the zones is 1 to 50; "middle" when the maximum value of the memory MEM1n for all the zones is 51 to 150; and "large" when the maximum value of the memory MEM1n for all the zones is 151 or greater. In Zone 34, since the value of the memory MEM12 is 100, "middle" is displayed. The "adhesion strength of a fingerprint" is "low" when the maximum value of the memory MEM2n for all the zones is 0: "middle" when the maximum value of the memory MEM2n for all the zones is 1; and "high" when the maximum value of the memory MEM2n for all the zones is 2. In Zone 34, since the value of the memory MEM21 is 1, "middle" is displayed. The "the position of an adhered fingerprint" is "inner perimeter" when a zone where n is not 0 is present between Zone 0 and Zone 10; "intermediate position" when a zone where n is not 0 is present between Zone 11 and Zone 23; and "outer perimeter" when a zone where n is not 0 is present between Zone 24 and Zone 34. Since n is not 0 in Zone 33 and Zone 34, "outer perimeter" is shown. The "abnormality other than a fingerprint" section indicates "abnormal" when any of the flags LPFNG, IDNG, SRVNG, and WBNG is output; and "normal" when none of the flags LPFNG, IDNG, SRVNG, and WBNG are output.

The display of the monitor 50 is produced based on the above edited information. When the "abnormality other than a fingerprint" section indicates "normal", nothing is displayed on the monitor 50. When the "abnormality other than a fingerprint" section indicates "abnormal", a message "Abnormality occurred in disc or apparatus. Remove and check disc, and power on apparatus again" is displayed on the monitor 50. In the example illustrated in FIG. 19, the region 1909 entitled "Feature of dirt" shows "Number: 2"; "Size: middle"; "Concentration: middle"; and "Position: outer perimeter". In the diagram 1908 entitled "General dirt position", a model of a fingerprint is displayed in the outer perimeter region 1903 because the "position of an adhered fingerprint" is "outer perimeter".

Figure 20:
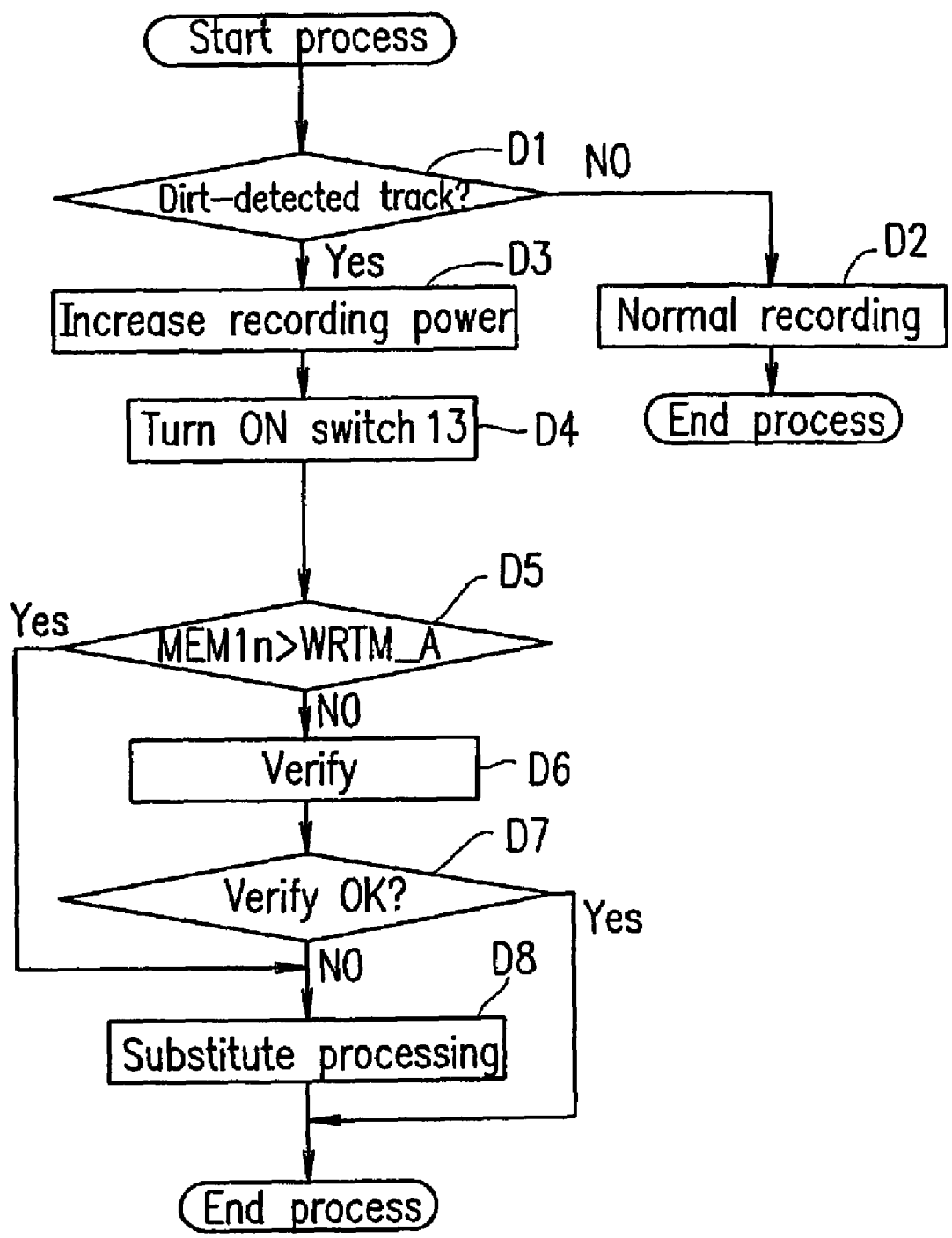
FIG. 20 is a flowchart which illustrates an operation of an apparatus when recording is performed in a track from which a fingerprint is detected.
Figure 21:
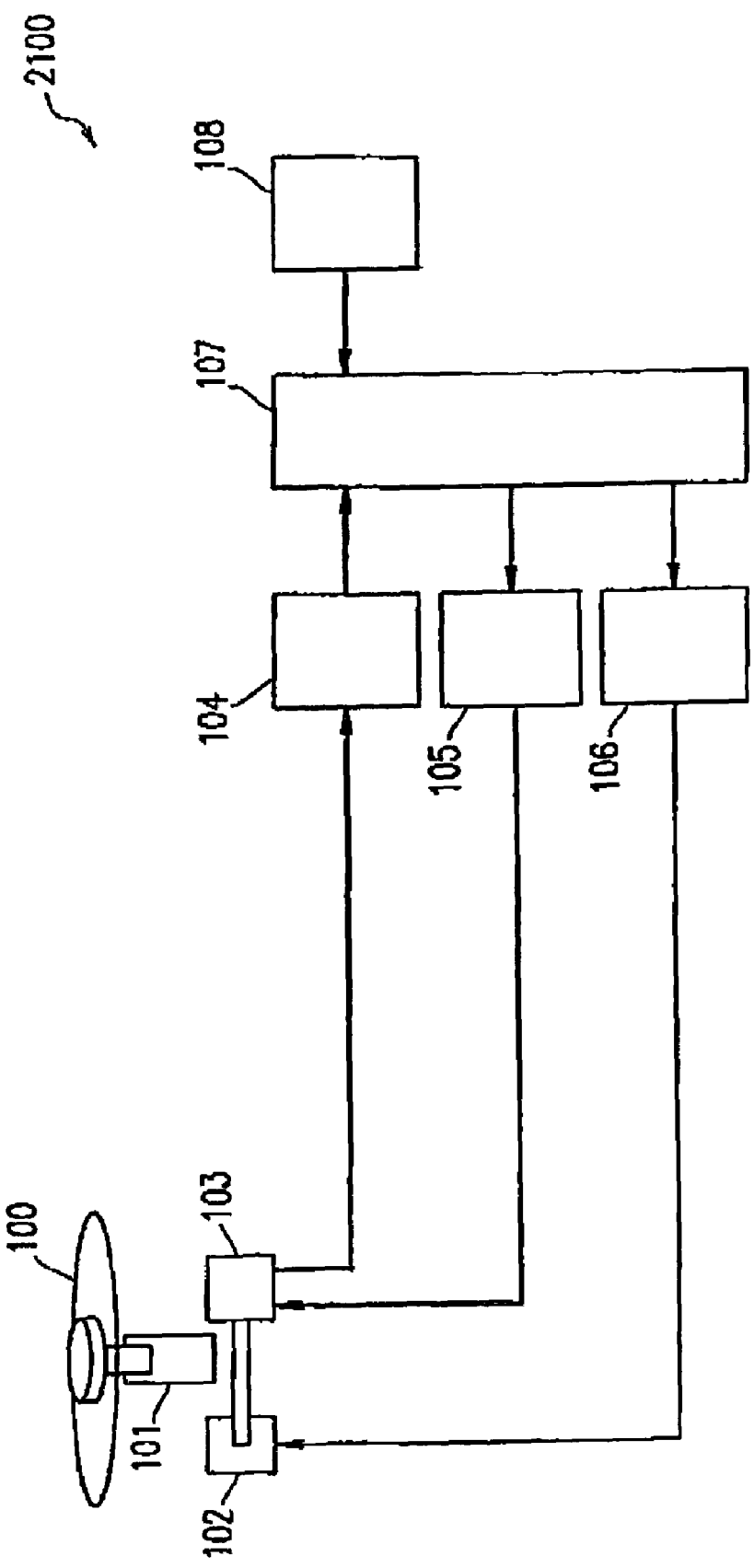

Lastly, operation of the disc apparatus, which is performed when user data is recorded in a track of a zone where a fingerprint is detected through the above described processes, is described using a flowchart of FIG. 20. Before the process of FIG. 20 is started, the spindle motor 2 rotates the optical disc 1 at a predetermined rotation velocity; and the servo controller 25 performs focusing control such that the light beam is focused on an information recording plane of the optical disc 1, and performs tracking control such that the light beam follows a track of the optical disc 1. Assume that at this time, the light beam is present in a track in Zone 32 where a fingerprint is detected, for performing a user data recording operation.

At process step D1, it is determined whether or not a track in which recording is currently performed is a track in a zone where a fingerprint has been detected. Since the track in which recording is currently performed is in Zone 34 where a fingerprint has been detected, the process proceeds to process step D3. At process step D3, the recording power output from the pickup 4 is increased. By increasing the recording power, a power of the light beam reduced due to a fingerprint can be compensated for such that a sufficient power of light beam reaches an information recording plane of the disc, and the probability that recorded data is lost can be reduced. Subsequently, at process step D4, the switch 13 is turned on for each track, and information obtained by the DSP 14 during a recording operation is input.

Subsequently, at process step D5, the value of the memory MEM1n obtained during the recording operation is compared with a specific value WRTM_A, and the process is branched. The specific value WRTM_A is a value corresponding to a limitation value of the amount of data which can be corrected after being recorded in a series of defect portions. In the case of a DVD-RAM disc, the limitation value indicates a data amount of about 2 kbytes. The time required for the light beam to pass through a region corresponding to 2 kbyte of data is about 0.7 ms, and therefore, WRTM_A=50 is a suitable value. In a track of Zone 34, the value of the memory MEM1n is 100, and therefore, there is a high possibility that user data is corrupted even though the recording operation is continued. Thus, the process proceeds to process step D8, where the recording operation is interrupted for changing the position of the light beam, and the user data is recorded in a substitute region. Thereafter, the process of FIG. 20 is ended. Herein, if the value of the memory MEM1n is equal to or smaller than WRTM_A=50 at process step D5, the process proceeds to process step D6. Even if a currently detected fingerprint is not a serious defect so that recorded user data can be corrected, it is possible that the user data cannot be corrected in the future due to a variation of the optical disc 1 with the lapse of time. Thus, a verify operation is performed at process step D6.

Subsequently, at process step D7, it is determined based on a result of the verify operation whether or not reproduced data is normal. If it is verified that the reproduced data is not normal, the process proceeds to process step D8, where a substitute processing is performed in the same manner as that described above. If it is verified that the reproduced data is normal, the process of FIG. 20 is ended. In the case where it is determined at process step D8 that a track in which recording of data is currently performed is a track in a zone where a fingerprint has not been detected, the process proceeds to process step D2, and the recording operation is performed with normal power. In order to increase the transfer rate of user data to be recorded, the process of FIG. 20 is ended without performing a verify operation.

Lastly, a method for recording information about a fingerprint detected on a disc, and an operation method of the microcomputer 15 for referring to the information about the fingerprint in a user data recording operation, are described.

In the descriptions provided in the above sections, a DVD-RAM disc is used as the disc 1. However, in a disc described in this example, which has a different structure to that of a DVD-RAM disc, a defect management region has a region in which information about a detected fingerprint is recorded according to a method of the present invention. In an optical disc in which data can be recorded a plurality of times, the defect management region is generally provided at an inner perimeter side or an outer perimeter side of the optical disc. In the defect management region, data which is referred to during operation of the optical disc apparatus, and which is different from the user data, is recorded. Especially, disc defect information is recorded therein. The defect information is an address of a sector, which is determined at the time of disc formatting, where a recording operation cannot be normally performed (address of an initial defect sector). Alternatively, the defect information is an address of a sector on which the above substitute processing is performed at the time of a user data recording operation (address of a secondary defect sector). Herein, assume that the disc 1 has a region in the defect management region for recording information about a fingerprint obtained by using a method of the present invention, in addition to the regions for storing an address of an initial defect sector and an address of a secondary defect sector. In the descriptions hereinabove, information about a fingerprint includes "the number of fingerprints", "the size of a fingerprint along the track direction", "the adhesion strength of a fingerprint", and "the position of an adhered fingerprint". In this example, however, each of "the number of fingerprints" and "the adhesion strength of a fingerprint" is recorded as a 1 byte data for each zone of a disc. Now, consider an example where a fingerprint where the maximum value of the memory MEM2n is 2 is attached on Zone 34 (22h); the number of fingerprints is 1 (n=1); and data "22h, 02h, 01h" is recorded. Herein, assume that the microcomputer 15 has a timer function, and is capable of recording in the disc 1 a date when information about a fingerprint was obtained. For example, consider that a date the function of the present invention was activated is Jan. 10, 2000, 15:00. The number "2000" is represented as "07D0h" in the hexadecimal representation. Thus, the above date is recorded as "07h, D0h, 01h, 0Ah, 0Fh". Further, each optical disc apparatus has a serial number. The serial number is recorded together as information for identifying an apparatus used for recording information about a fingerprint. For example, as for an apparatus which is manufactured by M company (M can be represented as "0Ch" if integers "0, 1, 2, . . . " are allocated to alphabet characters "A, B, C, . . . " respectively), which is of a product type "DA01", and which has a serial number "425632", information "0Ch, DAh, 01h, 42h, 56h, 32h" is recorded. In the above example, when information about a fingerprint adhered on the disc is obtained, data of 14 bytes in total, "23h, 02h, 01h, 07h, D0h, 01h, 0Ah, 0Fh, 0Ch, DAh, 01h, 42h, 56h, 32h" is serially recorded. Consider that the above information for all the zones is recorded in the defect management region at a time. In the case where a disc is divided into 35 zones as in a DVD-RAM disc, 490 byte data is recorded in the disc at a time. This data is updated and recorded every time information about a fingerprint is obtained.

The microcomputer 15 refers to the above 490 byte data when recording user data, and selects, by priority, a zone where the values of the "number of fingerprints" and the "adhesion strength of a fingerprint" are close to 0 as a region for recording data transmitted from a user. The microcomputer 15 accesses a track in the selected zone for recording data. As a result, the probability that user data is lost due to a fingerprint is decreased. For example, the 14 byte data for each zone is referred to, and a zone where the sum of second byte data and third byte data of the 14 byte data is 0 is selected by highest priority, and then, zones having a smaller sum of second byte data and third byte data are selected.

Herein, changes in a fingerprint start immediately after the fingerprint is adhered to a disc and progresses with the lapse of time. For example, a water content and an oil content decrease with the lapse of time. Accordingly, the adhesion strength of the fingerprint decreases. Once such a fingerprint has been wiped out, user data can be normally recorded in even a zone once recorded as a fingerprint-adhered zone. That is, in the case where a certain date, at which fingerprint information was obtained using the method of the present invention, precedes a time when user data is recorded by an appropriate length of time, the fingerprint information recorded in the defect management region may not be reliable. Furthermore, fingerprint information of the present invention is obtained by detecting a variation in the wobble amplitude as described above. However, the output level of the wobble amplitude is different among optical disc apparatuses. Thus, in the case where an apparatus used for recording data in the disc 1 is different from an apparatus used for obtaining fingerprint information, the fingerprint information, such as information about the adhesion strength, or the like, may not be reliable. The microcomputer 15 refers to the above 490 byte data when recording user data. If the date when fingerprint information is obtained is 2 or more days before, and the serial number of an apparatus used for obtaining that fingerprint data is different from that of an apparatus incorporating the microcomputer 15, the microcomputer 15 does not use the fingerprint information for selecting a region to record user data. In addition, a message that says "Dirt has been detected before. If you continue a data recording operation, it is possible that the data is corrupted. You are recommended to check the disc again about dirt." is displayed, thereby urging a user to acquire new fingerprint information using the method of the present invention. In the case where the date when fingerprint information was obtained is one or more days before but is not two or more days before, only a zone(s) where the sum of second byte data and third byte data of the 14 byte data is not 0 is selected, and a fingerprint detection operation according to the method of the present invention is again performed on the selected zones. Only in an interested zone, newly obtained information about a fingerprint is recorded over old information in the above 490 byte data region again. Thereafter, an operation for selecting a region to record data transmitted from a user is performed. When the date at which fingerprint information was obtained is not more than one day before, an operation for selecting a region to record data transmitted from a user is immediately performed.

The components shown in FIG. 1 are all commonly employed in general optical disc recording/reproducing apparatus, except for the envelop detection circuit 27 incorporated in the wobble amplitude detection circuit 8. Thus, it is not necessary to make a major modification to the structure of an existing apparatus in order to achieve the above described operation. Therefore, the above described operation of the present invention can be achieved without a substantial increase in cost.

In the above-described embodiment of the present invention, information displayed in the display section 16 is "the number of fingerprints", "the size of a fingerprint along the track direction", "the adhesion strength of a fingerprint", "the position of an adhered fingerprint", and "abnormality other than a fingerprint". However, information obtained through the processes illustrated in FIGS. 15 through 18 can be combined to produce various other display contents. Furthermore, it is appreciated that, for example, a display method where the adhesion strength of a fingerprint is indicated using different colors according to the value of the memory MEM2n is possible. Furthermore, in the above embodiment of the present invention, a DVD-RAM disc where address regions are divided by units of a sector has been described. However, it is appreciated that the effects of the present invention can be achieved in a disc where address regions are not divided by units of a sector, represented by a CD-RW disc, because one rotation of the disc can be detected by counting an FG pulse output in response to the rotation of the spindle motor 2 which is employed in a general optical disc apparatus.

INDUSTRIAL APPLICABILITY

As described above, according to the present invention, a variation level, a variation time, and a variation number of a wobble signal amplitude are detected for each track before performing a recording operation, and this detection operation is repeatedly performed for a plurality of tracks separated at an uniform interval. Based on information obtained through the above operation, information about dirt, such as a fingerprint adhered on a surface of a disc, is detected within a short time period. As a result, an advantageous effect of warning about an influence of dirt, such as a fingerprint, within a short latency time before a user begins a data recording operation is provided.

Furthermore, in the warning process, the condition of dirt, which is obtained based on the level of a variation in reflected light or a variation number, is displayed on a monitor screen, or the like. With such an arrangement, an advantageous effect of allowing a user to readily find dirt, such as a fingerprint or the like, can be obtained.

Further still, in the case where recording is performed in a region where dirt, such as a fingerprint or the like, has been found in advance, a measure is provided, for example, the laser power is increased, or the like, to obtain an advantageous effect of decreasing the probability that user data is lost in the recording operation when a user does not remove dirt, such as a fingerprint or the like.

The invention claimed is:

1. An optical disc recording/reproducing apparatus, comprising:
   recording/reproducing means for recording/reproducing information by emitting a light beam onto a disc having a track which wobbles at a predetermined frequency;
   reflected light detection means for detecting the light beam reflected from the disc;
   wobble signal detection means for detecting a wobble amplitude signal which represents an amplitude of a signal generated from a component which is extracted from an output of the reflected light detection means and which wobbles at the predetermined frequency;
   a low pass filter control section for passing a low band component of the wobble amplitude signal; and
   variation rate detection means for detecting dirt adhered on the disc,
   wherein the low pass filter control section has a passage characteristic which does not pass a variation frequency component caused due to the dirt but passes a rotation frequency component of the disc, and
   the variation rate detection means detects a variation rate by calculating a ratio of an output of the low pass filter control section to the wobble amplitude signal, thereby detecting the dirt based on the output of the low pass filter control section and the wobble amplitude signal before the recording/reproducing means records/reproduces the information.

2. An optical disc recording/reproducing apparatus according to claim 1, further comprising movement means for moving the recording/reproducing means to one of the plurality of tracks separated at a generally uniform interval on the disc,
   wherein the variation rate detection means detects the dirt only when one of the tracks, to which the recording/reproducing means is moved by the movement means, makes one rotation such that one identical dirt which extends over adjacent tracks is prevented from being redundantly detected while scanning the adjacent tracks.

3. An optical disc recording/reproducing apparatus according to claim 1, wherein:
   the disc has a track in a guiding groove and a track between the guiding grooves;
   the low pass filter control section includes
      a first low pass filter for extracting a low band component of the wobble amplitude signal when the recording/reproducing means is moved to a position corresponding to the track in the guiding groove, and
      a second low pass filter for extracting a low band component of the wobble amplitude signal when the recording/reproducing means is moved to a position corresponding to the track between the guiding grooves; and
   the low pass filter control section switches from the first low pass filter to the second low pass filter when the recording/reproducing means moves from the position corresponding to the track in the groove to the position corresponding to the track between the grooves, and switches from the second low pass filter to the first low pass filter when the recording/reproducing means moves from the position corresponding to the track between the grooves to the position corresponding to the track in the grooved.

4. An optical disc recording/reproducing apparatus according to claim 1, wherein:
   the low pass filter control section includes
      a first low pass filter for extracting a low band component of the wobble amplitude signal when the recording/reproducing means is moved to a position corresponding to the track in which the information has already been recorded, and
      a second low pass filter for extracting a low band component of the wobble amplitude signal when the recording/reproducing means is moved to a position corresponding to the track in which the information is not recorded; and
   the low pass filter control section switches from the first low pass filter to the second low pass filter when the recording/reproducing means moves from the position corresponding to the track in which the information has already been recorded to the position corresponding to the track in which the information is not recorded, and switches from the second low pass filter to the first low pass filter when the recording/reproducing means moves from the position corresponding to the track in which the information is not recorded to the position corresponding to the track in which the information has already been recorded.

5. An optical disc recording/reproducing apparatus according to claim 1, wherein:
the low pass filter control section includes
a first low pass filter having a first cutoff frequency, and
a second low pass filter having a second cutoff frequency which is lower than the first cutoff frequency; and
the low pass filter control section switches its output from the first low pass filter to the second low pass filter when the wobble amplitude signal is equal to or smaller than a predetermined ratio.

6. An optical disc recording/reproducing apparatus according to claim 5, further comprising storage means for storing information about the detected dirt,
wherein the storage means stores information about a position of a track along a radial direction on the disc where the wobble amplitude signal is equal to or smaller than the predetermined ratio.

7. An optical disc recording/reproducing apparatus according to claim 1, wherein an output of the variation rate detection means is stopped when an output of the low pass fitter control section is equal to or smaller than a specific value.

8. An optical disc recording/reproducing apparatus according to claim 1, further comprising:
warning means for warning about a feature of the dirt, thereby warning that the dirt is adhered on the disc;
signal reproducing means for reproducing the information based on an output of the reflected light detection means; and
servo means for controlling the recording/reproducing means so as to follow the track on the disc,
wherein the warning means warns that it is impossible to warn about the feature of the did when the output of the low pass filter control section is equal to or smaller than the specific value, at which the output of the variation rate detection means is stopped, after a passage of a predetermined time period,
the warning means warns that it is impossible to warn about the feature of the dirt when the signal reproduction means cannot recognize information of an address region, and
the warning means warns that it is impossible to warn about the feature of the dirt when an output of the servo means is in an abnormal state.

9. An optical disc recording/reproducing apparatus according to claim 1, further comprising storage means for storing information about the detected dirt,
wherein the storage means stores a rate of a variation in the wobble amplitude signal as information which indicates an adhesion strength of the dirt.

10. An optical disc recording/reproducing apparatus according to claim 9, further comprising warning means for warning about a feature of the dirt, thereby warning that the dirt is adhered on the disc;
the warning means provides a warning of any of information indicating an adhesion strength of the dirt, information which indicates the size of the dirt, information which indicates the number of the dirt, and information which indicates the position of the dirt, which are stored in the storage section, in combination.

11. An optical disc recording/reproducing apparatus according to claim 10, further comprising a monitor screen,
wherein the warning section displays on the monitor screen any of information among the adhesion strength of the dirt, the size of the dirt, the number of the dirt, and the position of the dirt, in combination, thereby warning about the feature of the dirt.

12. An optical disc recording/reproducing apparatus according to claim 1, further comprising:
storage means for storing information about the detected dirt; and
a dirt passage time counter for measuring a period when the wobble amplitude signal is equal to or smaller than a predetermined ratio,
wherein the storage means stores an output of the dirt passage time counter as information which indicates the size of the dirt.

13. An optical disc recording/reproducing apparatus according to claim 12, further comprising rotation velocity ratio detection means for obtaining a ratio of a disc rotation velocity with respect to a reference disc rotation velocity which is used as a reference for recording/reproducing the information,
wherein the storage means corrects an output of the dirt passage time counter according to an output of the rotation velocity ratio detection means, and stores the corrected output, and
the storage means corrects an output of the dirt passage time counter by multiplying the output of the dirt passage time counter by a reciprocal of the output of the rotation velocity ratio detection means, and stores the corrected output.

14. An optical disc recording/reproducing apparatus according to claim 12, wherein in the case where an output of the dirt passage time counter, obtained when the wobble amplitude signal is equal to or smaller than a predetermined ratio, is equal to or smaller than a specific value, the storage means stores an output of the dirt passage time counter obtained when the recording/reproducing means is moved to a track distant by several tracks.

15. An optical disc recording/reproducing apparatus according to claim 1, further comprising:
storage means for storing information about the detected dirt; and
a dirt number counter for counting the number of times the wobble amplitude signal decreases to a level equal to or smaller than a predetermined ratio within one disc rotation period,
wherein the storage means stores an output of the dirt number counter as information which indicates the number of dirt.

16. An optical disc recording/reproducing apparatus according to claim 15, wherein:
the dirt number counter counts the number of times an increase of the wobble amplitude signal to a level greater than a predetermined ratio, which occurs after a decrease of the wobble amplitude signal to a level equal to or smaller than the predetermined ratio, is detected; and
where a time when the wobble amplitude signal is decreased to a level equal to or smaller than the predetermined ratio is a first time point, a time when the wobble amplitude signal exceeds the predetermined ratio after the first time point is a second time point, and a time when the wobble amplitude signal is decreased to a level equal to or smaller than the predetermined ratio again is a third time point, the dirt number counter does not count the number of times at the second time point when a period from the second time point to the third time point is equal to or smaller than a specific time period.

17. An optical disc recording/reproducing apparatus according to claim 1, wherein:
the track is divided into sectors;
the optical disc recording/reproducing apparatus further includes an edge counter for counting the number of sectors; and
one rotation of the disc is detected when an output of the edge counter becomes equal to the number of sectors in a track at which the recording/reproducing means is located.

18. An optical disc recording/reproducing apparatus according to claim 1, wherein:
the recording/reproducing means includes a light source; and
in the case where the recording/reproducing means performs a recording/reproducing operation in a track where dirt has been previously detected, an output of light emitted from the light source is increased for recording or reproduction.

19. An optical disc recording/reproducing apparatus according to claim 1, further comprising a dirt passage time counter for measuring a period when the wobble amplitude signal is equal to or smaller than a predetermined ratio,
wherein substitute processing is performed when an output of the dirt passage time counter becomes equal to or greater than a specific value during a recording operation in a track where dirt has been previously detected.

20. An optical disc recording/reproducing apparatus according to claim 19, wherein:
the recording/reproducing means includes a light source, and optical means for converging light emitted from the light source at the disc; and
the specific value is a value corresponding to a time period when light emitted from the light source moves over a series of defects, for which a data error can be corrected, when the disc rotates at a reference disc rotation velocity which is used as a reference for recording/reproducing information.

21. An optical disc recording/reproducing apparatus according to claim 1, wherein:
the information is recorded on the disc by units of a sector;
the disc has an address region where an address for identifying the sector is recorded for each sector; and
an input to the low pass filter is stopped while the light beam passes through the address region.

22. An optical disc recording/reproducing apparatus according to claim 9, wherein:
a plurality of values which indicate rates of a variation in the wobble amplitude are prepared; and
the storage means stores one of the plurality of values closest to a value which indicates a largest variation rate of the wobble amplitude signal output from the wobble signal detection means, as information which indicates an adhesion strength of dirt.

23. An optical disc recording/reproducing apparatus according to claim 22, wherein in the case where a plurality of dirt are adhered on the disc, in order to record user data in the disc, a region where an adhesion strength of dirt is low is selected by priority among regions having dirt which are stored in the storage region, as a recording region for the user data.

24. An optical disc recording/reproducing apparatus according to claim 10, wherein when a specific period has elapsed after the storage means records information about dirt adhered on the disc, warning processing is performed for urging that a dirt detection process be executed again.

25. An optical disc recording/reproducing apparatus according to claim 10, wherein: when the storage means records information about dirt adhered on the disc, the information about the dirt is recorded in a predetermined region of the disc, and simultaneously, information about an apparatus used for recording the information about the dirt is recorded together in the predetermined region; when information is read out from the disc, if the information about the apparatus recorded in the predetermined region is different from information about an apparatus used for information reading, warning processing is performed for urging that a dirt detection process be executed again.

26. An optical disc having a predetermined region in which information about dirt adhered on the optical disc is recorded by the optical disc recording/reproducing apparatus of claim 25.

* * * * *

UNITED STATES PATENT AND TRADEMARK OFFICE
CERTIFICATE OF CORRECTION

PATENT NO. : 7,023,777 B2  Page 1 of 1
APPLICATION NO. : 10/169985
DATED : April 4, 2006
INVENTOR(S) : Atsushi Miyazaki, Chikashi Inokuchi and Hiroyuki Yamaguchi It is certified that error appears in the above-identified patent and that said Letters Patent is hereby corrected as shown below:

Column 34, line 49, "grooved" should read
-- groove --.

Column 35, line 41, "did" should read
-- dirt --.

Signed and Sealed this

Twenty-first Day of November, 2006

JON W. DUDAS
*Director of the United States Patent and Trademark Office*